US010362736B2

(12) United States Patent
Visser et al.

(10) Patent No.: US 10,362,736 B2
(45) Date of Patent: Jul. 30, 2019

(54) ASSEMBLY OF A PLANT POT HAVING A WICK AND A CONTAINER

(71) Applicant: WATERWICK B.V., 's-Gravendeel (NL)

(72) Inventors: Anthony Visser, 's-Gravendeel (NL); Lawrence Joseph Contillo, III, Weaverville, NC (US)

(*) Notice: Subject to any disclaimer, the term of this patent is extended or adjusted under 35 U.S.C. 154(b) by 196 days.

(21) Appl. No.: 14/398,100

(22) PCT Filed: Apr. 29, 2013

(86) PCT No.: PCT/EP2013/058867
§ 371 (c)(1),
(2) Date: Oct. 30, 2014

(87) PCT Pub. No.: WO2013/164300
PCT Pub. Date: Nov. 7, 2013

(65) Prior Publication Data
US 2015/0135591 A1 May 21, 2015

Related U.S. Application Data

(63) Continuation of application No. 13/868,606, filed on Apr. 23, 2013, now abandoned.

(30) Foreign Application Priority Data

May 1, 2012 (EP) ..................................... 12166280

(51) Int. Cl.
*A01G 27/04* (2006.01)
*A01G 9/02* (2018.01)
(Continued)

(52) U.S. Cl.
CPC .............. *A01G 9/02* (2013.01); *A01G 9/143* (2013.01); *A01G 27/008* (2013.01); *A01G 9/006* (2013.01); *A01G 9/045* (2013.01); *Y02A 40/252* (2018.01)

(58) Field of Classification Search
CPC ........ A01G 27/008; A01G 9/006; A01G 9/04; A01G 9/042; A01G 9/045; A01G 9/047;
(Continued)

(56) References Cited

U.S. PATENT DOCUMENTS 3,898,766 A * 8/1975 Goldstaub .............. A01G 27/04
47/81
4,117,631 A * 10/1978 Tull ........................ A01G 27/04
47/81
(Continued)

FOREIGN PATENT DOCUMENTS

CN 201640070 4/2010
DE 19800843 7/1999
(Continued)

*Primary Examiner* — Thanh Pham
(74) *Attorney, Agent, or Firm* — J. Wiley Horton

(57) ABSTRACT

The present invention relates to an assembly, comprising a plant pot (258) having a bottom (260) and at least one side wall (264), extending from the bottom up to a top rim and at least one hole (268) which is arranged in or at least near the bottom, at least one wick (30) extending from below the bottom and through the hole and a container (256), dimensioned to accommodate at least a bottom portion of the plant pot comprising the hole through which the wick extends out of the plant pot. The container and the plant pot in an assembled state define a reservoir to accommodate fluid, such as water, for the plant to be drawn up through the wick during at least one of growing, transporting and display for sale of a plant in the plant pot, which is accommodated in the container. An overflow (284) with a controllable valve (288)

(Continued)

may function to distinguish between a stationary state of the assembly and transport thereof.

10 Claims, 23 Drawing Sheets

(51) Int. Cl.
*A01G 27/00* (2006.01)
*A01G 9/14* (2006.01)
*A01G 9/00* (2018.01)
*A01G 9/04* (2006.01)

(58) Field of Classification Search
CPC .... A01G 27/00; A01G 27/003; A01G 27/006; A01G 27/02; A01G 27/04; A01G 27/06
See application file for complete search history.

(56) References Cited

U.S. PATENT DOCUMENTS

| | | | | |
|---|---|---|---|---|
| 4,339,891 A * | 7/1982 | Bassett | ............... | A01G 27/04 47/71 |
| 4,393,622 A * | 7/1983 | Gallo, Sr. | ............... | A01G 5/06 40/645 |
| 4,805,343 A * | 2/1989 | Patterson | ............... | A01G 27/04 47/48.5 |
| 4,887,388 A | 12/1989 | Waltel | | |
| 4,903,432 A | 2/1990 | Velagaleti | | |
| 4,965,963 A | 10/1990 | Lyon | | |
| 4,967,506 A * | 11/1990 | Lawson | ............... | A01G 17/04 47/44 |
| 5,193,305 A * | 3/1993 | Holtkamp, Jr. | ........ | A01G 27/04 47/81 |
| 5,279,070 A * | 1/1994 | Shreckhise | ............ | A47G 7/025 47/39 |
| 5,329,729 A * | 7/1994 | Liang | .................... | A01G 27/06 47/81 |
| 5,438,796 A * | 8/1995 | Nathan | .................. | A01G 9/006 47/66.6 |
| 5,673,511 A | 10/1997 | Holtkamp | | |
| 5,722,201 A * | 3/1998 | Diorio | .................... | A01G 27/06 47/66.7 |
| 6,115,959 A | 9/2000 | Schusterick | | |
| 6,192,623 B1 * | 2/2001 | Higginbotham | ....... | A01G 29/00 47/48.5 |
| 6,381,900 B1 * | 5/2002 | Crowley | ................ | A01G 9/024 47/29.1 |
| 2006/0240215 A1 * | 10/2006 | Whaley | .................. | A47C 31/00 428/66.6 |
| 2007/0089366 A1 | 4/2007 | Kasatshko | | |
| 2009/0223124 A1 | 9/2009 | Pasquariello | | |
| 2010/0218422 A1 | 9/2010 | Eckert | | |
| 2011/0131879 A1 | 6/2011 | Altendorfer | | |

FOREIGN PATENT DOCUMENTS

| | | |
|---|---|---|
| EP | 0688497 | 12/1995 |
| FR | 2637156 | 4/1990 |
| GB | 976809 | 12/1964 |
| GB | 1533115 | 11/1978 |
| GB | 2444141 | 5/2008 |
| WO | WO 80/02359 | 5/1980 |
| WO | WO 2008/066289 | 6/2008 |
| WO | WO 2011/047687 | 4/2011 |

\* cited by examiner

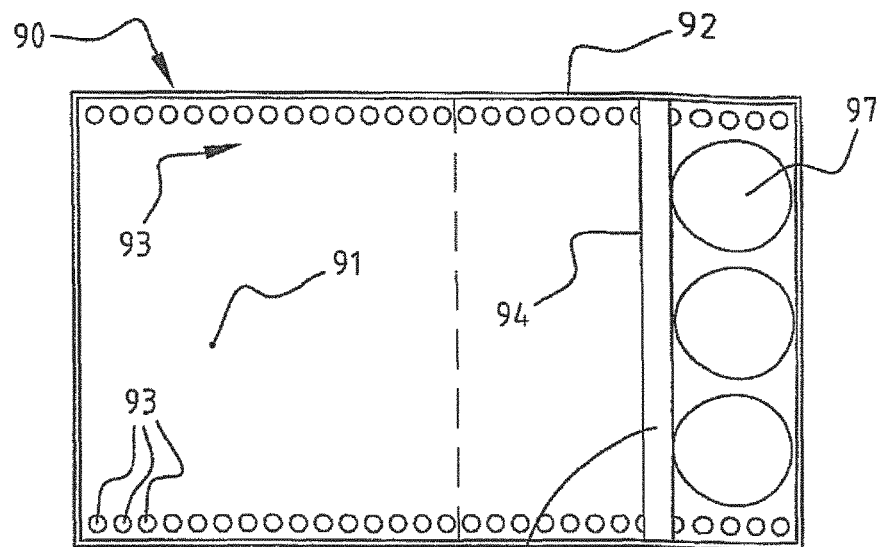
FIG. 12
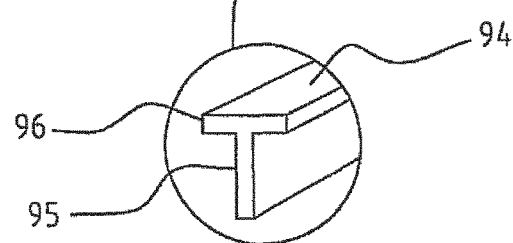
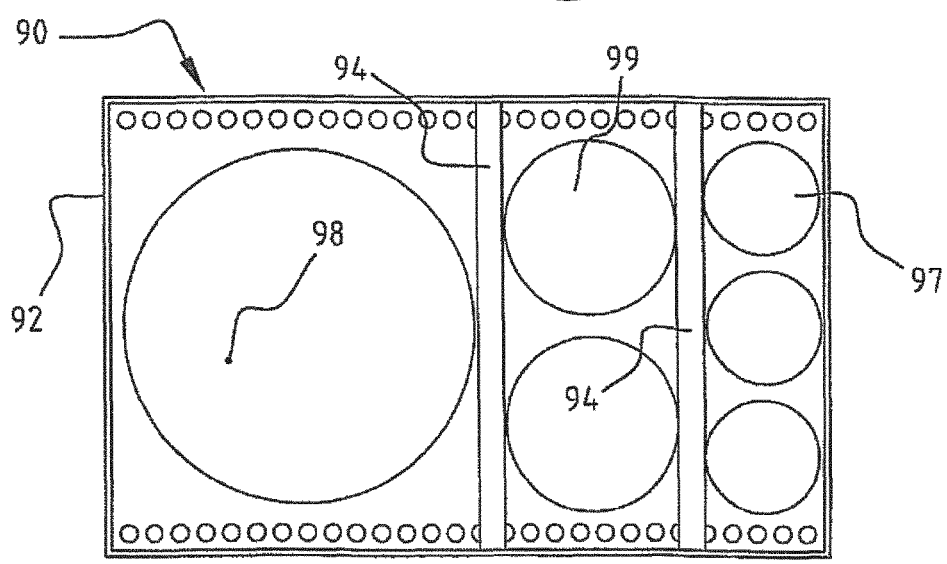
FIG. 13

ASSEMBLY OF A PLANT POT HAVING A WICK AND A CONTAINER

The present invention relates in general to a plant pot from which a wick extends at or through the bottom of the plant pot.

According to the invention, an assembly thereof with a container is proposed, which allows a more versatile application of the plant pot. More in particular embodiments of the present invention allow the plant to be progressed through different stages, such as growing, transporting and display for sale, all in the same assembly of the plant pot with the wick and the container.

To this end the present invention proposes, in more detail, an assembly as defined in the single appended independent assembly claim 1. The hole may be pre-arranged or drilled at the time at which inserting the wick is to be executed.

Preferably the assembly exhibits the features that the container is pot shaped and dimensioned to accommodate a single plant pot.

Additionally or alternatively, the assembly exhibits the features that the container comprises an overflow defining a free passage for entry and/or outflow of water into and out of the container.

Additionally or alternatively, the assembly according to the present invention exhibits the features that the overflow is arranged at a predetermined height above a bottom of the container, whereby the reservoir for fluids, being designed to comprise a predetermined amount or volume of fluids, is defined by the plant pot, the container and the height of the overflow above the bottom of the container.

In such an embodiment, the assembly according to the invention preferably exhibits the feature that the overflow is provided in at least one of the side wall and a raised base part, such as a central tower, of the bottom of the container, which is arranged to accommodate the plant, pot thereon with the bottom of the plant pot at a height of the raised base part above the bottom of the container.

Therein, the assembly according to the present invention preferably further exhibits the features that the overflow is arranged in or at a top of the raised base part, for instance on a cylindrical ring on the raised base part. Additionally or alternatively, the assembly may exhibit the feature of comprising a selectively controllable valve, which is arranged in the overflow and is operable and movable between an open position in which said valve allows said liquid to flow through said overflow and a closed position in which said valve prevents flow of said liquid through said overflow, for instance to distinguish between transport and a stationary positioning of the assembly and/or regulating a fluid level inside the container when placed in an ebb and flood irrigation system.

Additionally or alternatively, the assembly exhibits the features, at least during growing of a plant in the plant pot, of a tray having an ebb and flood based watering system. An example, the plant pot may be suspended in the container above a water level in the container with the wick extending down into the water in an ebb cycle and the plant pot including the soil or substrate therein may be flooded during a flood cycle, where fluid enters or leaves the container in accordance with the ebb and flood based watering system of the tray. Flooding the plant pot may be achieved by either or both of raising the water level and lowering the either or both of the plant pot and the container into water in respectively the container and the tray. Although many ebb and flood based watering systems with a tray and separately therefrom plant pots are known, and it may be considered logical to insert such plant pots into a water body contained in such known trays, this embodiment according to the invention with the plant pot in a container and then inserted into the water body is in contrast considered to be both novel and inventive, as no disclosures are known to the inventors of the present invention that teach the skilled person to contemplate the assembly of more than merely the plant pot and the tray, whereas the invention prescribes the assembly to include the container in addition. As a consequence many novel and inventive possibilities are opened up for the artisan, for instance in conjunction with overflow openings as discussed above and herein below, with which increased control over the fluid content of the reservoir is enabled, even independently from the ebb and flood based watering system of the trays.

Preferably the assembly exhibits the features that the plant pot comprises at least one indentation in at least one side wall thereof, where the indentations are oriented from the bottom of the plant pot towards an upper edge of the side wall. Preferably then the assembly with a container further exhibits the feature that the indentation defines a water feed channel in combination with the container, to enable addition of fluid, such as water, there along to a water supply or the reservoir, which is located essentially underneath the plant pot in an assembled state of the plant pot and the container. Along the thus formed channel, the reservoir may be replenished, without disassembling the assembly of the plan pot and the container. The provision of a water feed channel in this manner is not enabled or obvious in light of disclosures in general of two part plant pots having an inner and an outer pot, wherein the inner plant pot may have strengthening ribs to fortify the inner pots, which ribs do not allow for the formation of a feed channel in conjunction with the outer pot. For instance US-2010/0218422 relates to such a known configuration where the inner pot rests on internal, shoulders of the outer pot, whereby a space defined in or by the strengthening ribs is separated from, the reservoir, without any fluid communication there between such that, no feed channel of water through those known ribs is available to replenish fluids in the reservoir. Further, the assembly may exhibit the feature of an indicator of the fluid level in the reservoir, such as a float or straw, said indicator being arranged in said, water feed channel. Yet further, the assembly may exhibit the feature that a label is arranged on the free end of the indicator, opposite the end extending into the water supply.

Preferably the assembly exhibits the features that the container is a tray which is shaped and dimensioned to accommodate a plurality of plant pots at plant pot positions. Therein, the assembly preferably further exhibits the features that the tray comprises an articulated bottom having recesses comprising shoulders for preferably close fitting support of the plurality of plant pots and further depressions defining fluid reservoirs for accommodating fluids and wicks extending downward from the plant pots. Additionally or alternatively the assembly according to the present invention farther preferably exhibits the feature that at least one channel extends between two adjacent plant pot positions. Preferably the assembly with indentations and channels exhibits the features that the indentation is aligned with the channel to allow fluids to flow between recesses.

Preferably the assembly with a tray for a plurality of plant pots exhibits the features that a separator beam is adjustably arranged in the container to bolster plant pots in the container in an upright position.

Preferably the assembly with a tray for a plurality of plant pots exhibits the feature of a collapsible frame to be, in an extended state thereof, inserted between trays to form a stack of trays forming a transportable stack suitable for display for sale.

The present invention will be described in further detail herein below, where reference is made to the accompanying drawings of several preferred and other embodiments, in which the same reference numbers may be used for the same or similar features of distinct embodiments, and of which it is noted that scope of protection for the invention is not to be limited to any such embodiment, but that the invention is only bound by the limitations of the accompanying claims, and then only the independent ones of these claims. In the drawings:

FIG. 12 and FIG. 13 show schematic top views of plant pots in an alternative accommodating tray suitable for growing, transporting and displaying for sale of plants;

Figure 1:
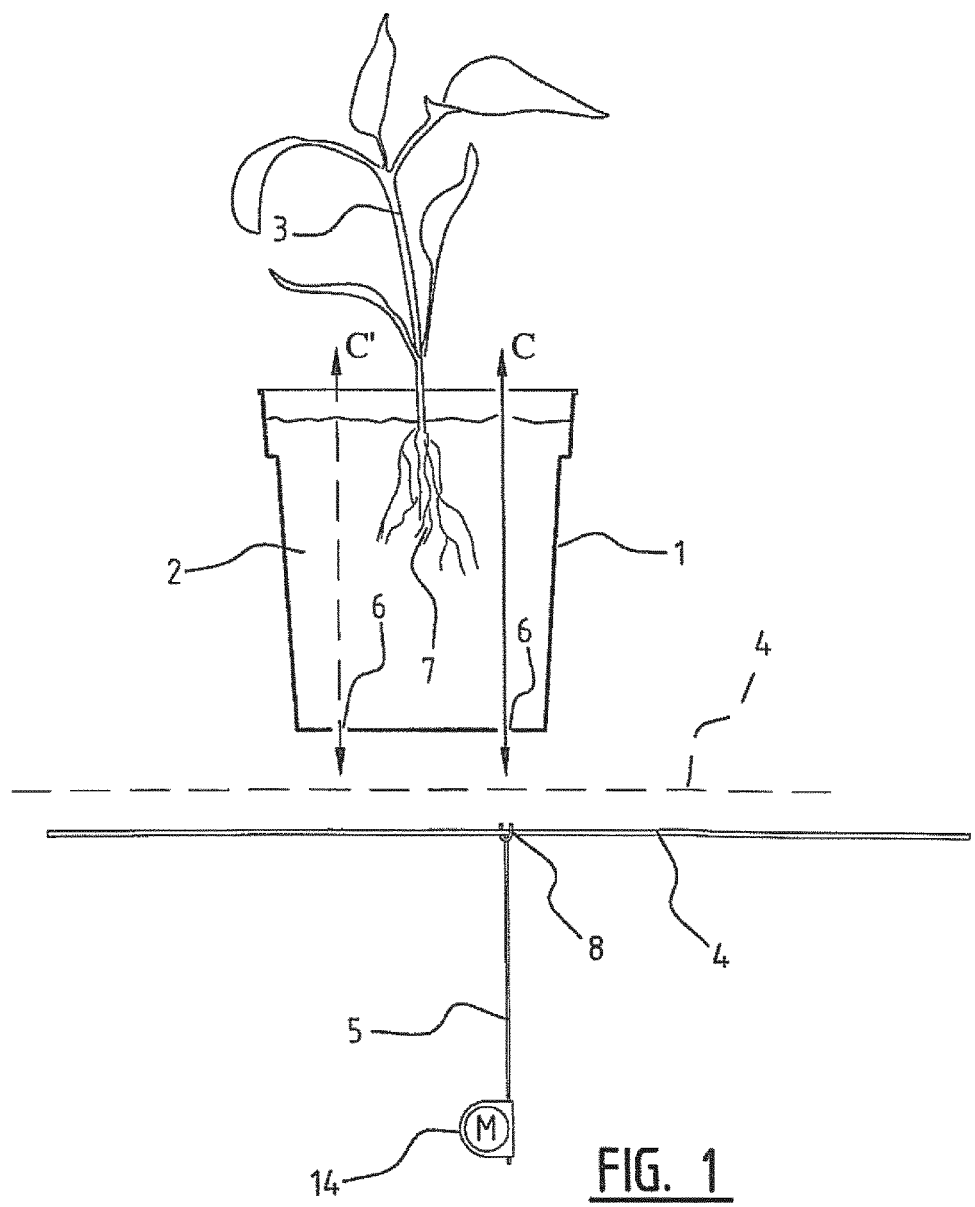
FIG. 1 shows a schematic side view of a plant pot and a wick to be inserted in the plant pot.

FIG. 1 shows a plant pot 1, containing soil 2 or any suitable substrate, like coco, peat, stone wool or glass wool or the like. Also in plant pot 1 a plant 3 is shown to clarify the purpose of the plant pot. However, at the stage depicted in FIG. 1 sore usually a plant 3 will not already be growing in the soil 2.

Namely, plant pot 1 comprises a number of bottom holes 6 in the bottom thereof. These are customary and pre-arranged or may be drilled in the plant pot 1 at a time just before inserting the wick is to be executed. For instance customary holes 6 may allow a surplus of water to be discharged from the plant pot 1, and/or roots 7 of a plant 3 may be provided with air through the bottom holes or may be allowed to grow through the holes 6 in the bottom of the plant pot. A newly drilled hole may be provided in a plant pot 1 solely for the purpose of arranging a wick 4.

Notwithstanding the moment of arranging the hole 6 (during production of the plant pot 1 or later, just before inserting the wick), measures need to be taken to allow aligned inserting of the wick 4 through the hole 6.

In FIG. 1 an inserting lance 5 is shown, forming a part of a system for processing plant pots 1, of which in FIG. 1 only the inserting lance 5 is shown in conjunction with a drive 14. The inserting lance 5 has an engaging head 8, which is hook-shaped in order to engage the wick 4. The wick 4 has a predetermined, length, and the engaging head 8 is arranged to engage the wick 4 approximately midway. At this time the wick may be tensioned as shown in and described below referring to FIGS. 16-21. Where in the present specification an inserting lance is referred to, this expression is intended to encompass all possible equivalents, such as a needle, a simple stick or rod, or any other elongate element capable of being aligned to a bottom hole and driven there through, and enabling that the wick is engaged and inserted though the pot's bottom hole.

The engaging head 8 is to have sufficiently small dimensions to pass the inserting lance 5 with the engaging head 8 through one of the bottom holes 6 of the plant pot 1, when the drive 14 is selectively operated or activated. In order to be driven through a selected one of the bottom, holes 6 in the bottom of the plant pot 1, the inserting lance 5 with the engaging head 8 is connected to the drive 14. The drive 14 enables the inserting lance 5 with the engaging head 8 to be inserted into and withdrawn back out of the plant pot 1 through the bottom hole 6 thereof in the direction of double arrow C. Thereby, the inserting lance 5 is driven upwards, taking the wick 4 along to be extended into the soil 2 in the plant pot 1. Thereafter, the inserting lance 5 is retracted by the drive 14 in a downward, direction in the schematic representation of FIG. 1, leaving the wick 4 behind. The inserting speed, of the inserting lance 5 may vary and depend for instance on the consistency of the soil or other substrate in the plant pot. Speeds of more than 0.5 up to 5 or 15 cm/s may be effective for inserting the wick 4 using the lance and the drive 14 thereof. For automated applications as envisaged here with the present invention, the inserting speed may vary also and depend on (must at least correspond with) the supply and throughput speed of the plant pots. Preferred inserting speeds may be approximately 2-10 cm/s.

The wick 4 can be made from any suitable material that can exhibit a capillary action, such as a fibrous material, a woven or non-woven material, cotton, woven cotton rope, wool, acrylic string, hemp rope, synthetic shoe laces, chamois e.g. 100% rayon, braided polypropylene rope, polyester cord, nylon rope, etc. The wick material may be synthetic and/or natural, and/or designed not to be susceptible to rotting or quite the opposite—be allowed to rot in the course of time. It is noted, here that one or more than one additional wick may be inserted into a singular plant pot 1, which is schematically represented, with arrow C and second wick 4, which is shown in a dashed line. This may especially be called for in case of larger diameter pots for relatively large plants and/or if bottom holes 6 are small in relation, to a desired wick thickness, where a desired water pull up capacity may be achieved using a plurality of wicks, optionally inserted, in or through one bottom hole 6 or through a plurality of separate bottom holes 6.

Bottom boles may be dimensioned to have a diameter or effective opening (for instance in case of square holes) of 0.1 $cm^2$-5 $cm^2$, more preferably a size between 0.2-4 $cm^2$ and even more preferably a size of approximately 0.3-3 $cm^2$. The engaging head 8 must be dimensioned to pass through the bottom holes 6, without damage to the plant pots in the vicinity of the bottom holes 6. Either the holes (when designing the plant pot to correspond with the inserting head) of the head of the inserting lance (when designing the inserting lance, for instance to be used with pots of standard sizes) or both mast be made to correspond. Also, the choice of wick material must take the size of the bottom hole into account in particular since—as described below—the wick is doubled up in itself. Thus the wick may have dimensions, that are at most equal to half the free or effective opening of the bottom holes, into or through which it is to be inserted.

The pot may have any suitable and possibly commercially already available size, in non-limiting examples: a height of 11 cm and a top rim diameter of 12 cm; a height of 16 cm and a top rim diameter of 17 cm; or a height of 16.2 cm and a top rim diameter of 18.7 cm, etc. The size of the plant pots in fact does not really matter for the scope of the invention.

Figure 16:
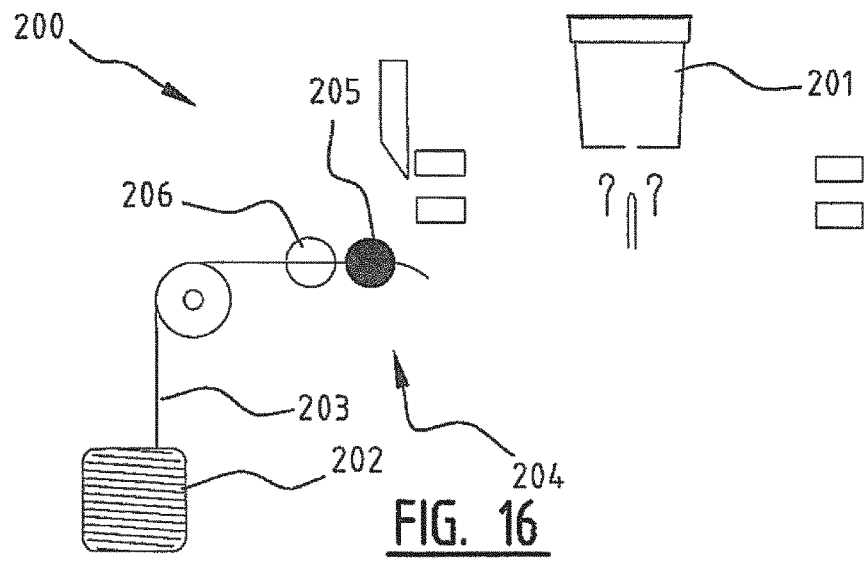
FIGS. 16-21 show a succession of steps and parts of a system for inserting a wick into a plant pot as depicted in FIGS. 1, 2 and 3.
Figure 17:
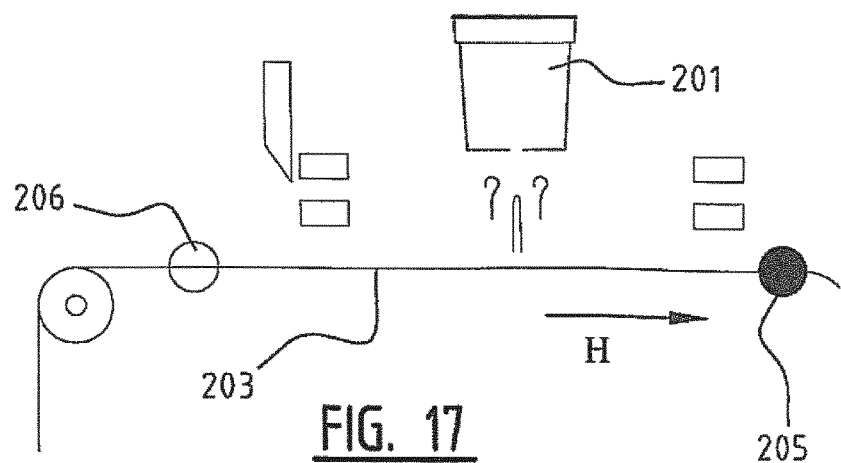
Figure 18:
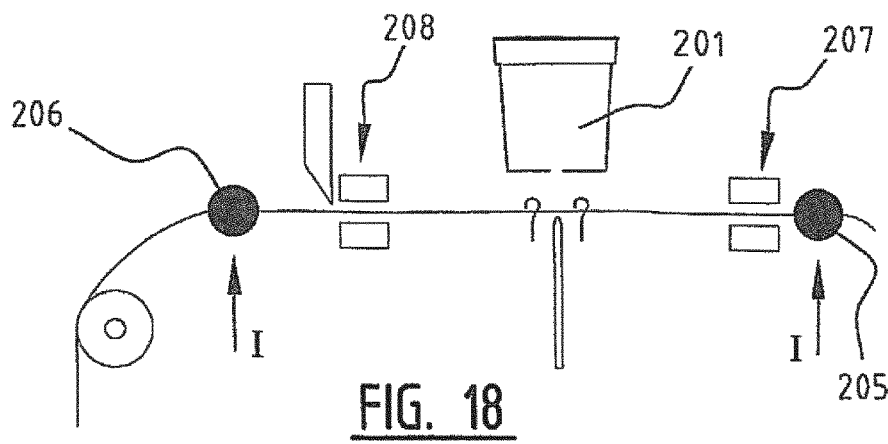
Figure 19:
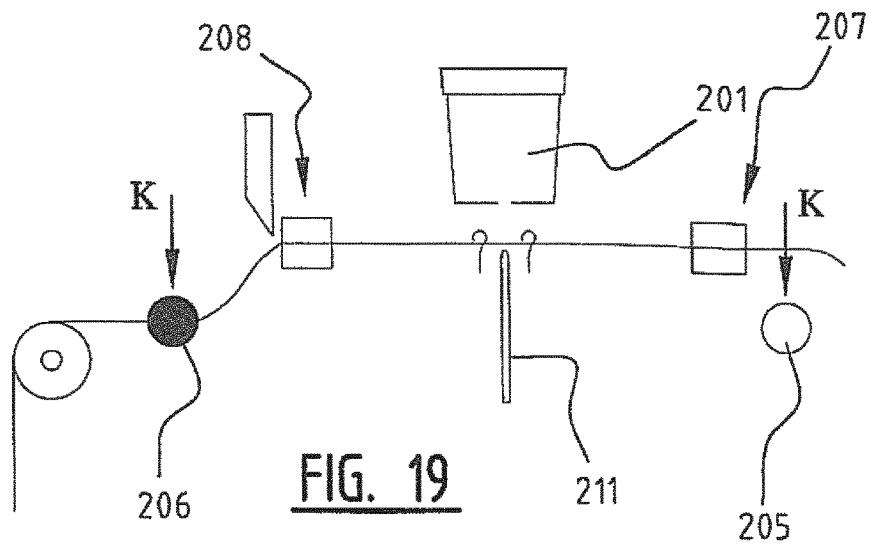

In FIG. 16, a more detailed representation is shown of a system 200 for inserting a wick into a plant pot 201. The system comprises a storage and supply 202 containing an uncut length of wire, cable, fabric or other wick material 203, which is fed to a pair of grippers 204. Alternatively, a pre-cut length of wick can be provided for inserting into the pot 201. The right most gripper 205 engages the uncut wick material 203, whereas the left gripper 206 does not engage the uncut wick material, in the representation of FIG. 16. The right gripper 205 then is moved to the right in FIG. 17, in the direction of arrow H, pulling the uncut wick material 203 through the open left gripper 206.

Figure 20:
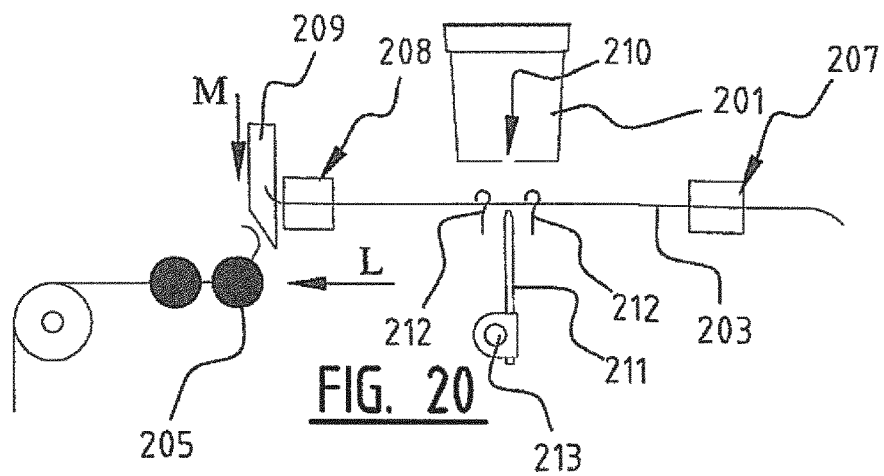

Thereafter, the left gripper 206 is driven to engage the uncut wick material 203, and the combination of the right gripper 205 and the left gripper 206, both engaging the uncut wick material 203, are moved in the direction of arrows I toward a pair of holders 207, 208, which can, just like the grippers 205, 206, be selectively activated to engage the uncut wick material 203. Moving from FIG. 18 to FIG. 19, the holders 207, 208 have been activated to engage the uncut wick material 203, where after the grippers 205, 206 can be moved back in the direction of arrows K, after the right gripper 205 has disengaged the uncut wick material 203. The left gripper 206 keeps engaging the wick material 203. Thereafter, moving from FIG. 19 to FIG. 20, the right gripper 205 is brought back to the vicinity of the left gripper 206 in the direction of arrow L and made to engage the uncut wick material 203. Thereafter, a knife 209 is brought down on the uncut wick material 203, which is tensioned between engaging left holder 208 and the right gripper 205 as a result a desired length of wick material 203 is made available for inserting thereof through hole 210 in plant pot 201, which predetermined length of wick material 203 is at that point of progress as shown in FIG. 20 still engaged by the right holder 207 and the left holder 208. The wick material may also be severed or cut using alternative means for the knife, such as a laser or heat source, a saw, scissors or a cutting clamp, and the like.

Hook shaped guides 212 are arranged on opposite sides relative to one another and the intermediate inserting lance 211, to guide the wick material 203 during an upward movement of the lance 211 when the drive 213 is activated or operated, to move the lance 211 in the direction of arrow C (and back).

Once the determined and (pre-) cue length of wick material 203 is engaged by the tip of the inserting lance 211, the left holder 208 and the right holder 207 may disengage the cut length of wick material 203.

Figure 21:
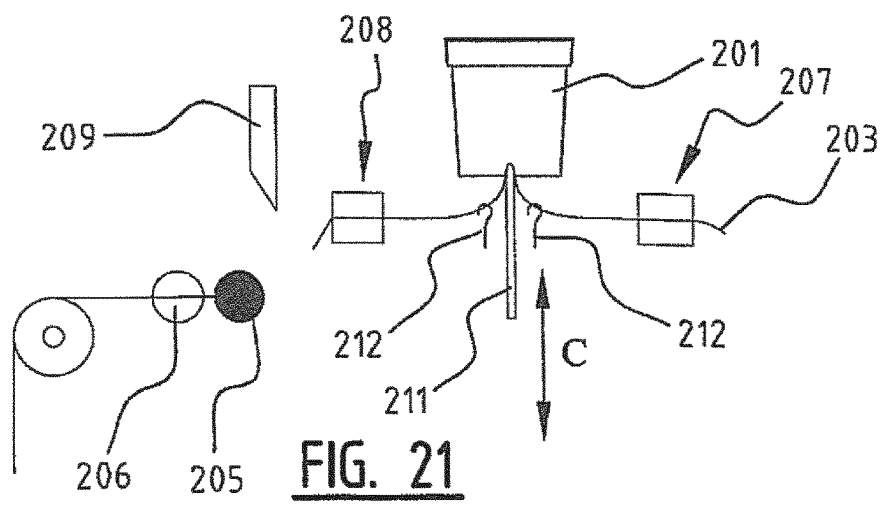

Alternatively, the holders 207, 208 may keep their engagement on the cut length of wick material 203 during the inserting movement in the direction of arrow C of the inserting wick 211, as a consequence of which the holders 207, 208 must be arranged, in a movable fashion to move towards and away from the inserting lance 211 in a horizontal direction in the representation of FIG. 21. After the wick has been introduced sufficiently, the holders should disengage the cut length, of the wick so as not to pull the wick out of the plant pot.

In the meantime, in FIG. 21, the left gripper 206 will have disengaged the uncut wick material 203, so that after withdrawal of the inserting lance 211 from the plant pot 201, the starting configuration of FIG. 16 is reestablished. Thereafter, a new plat pot 201 can be subjected to the operations of a system which schematically functions in accordance with the representation of FIGS. 16-21.

Figure 2:
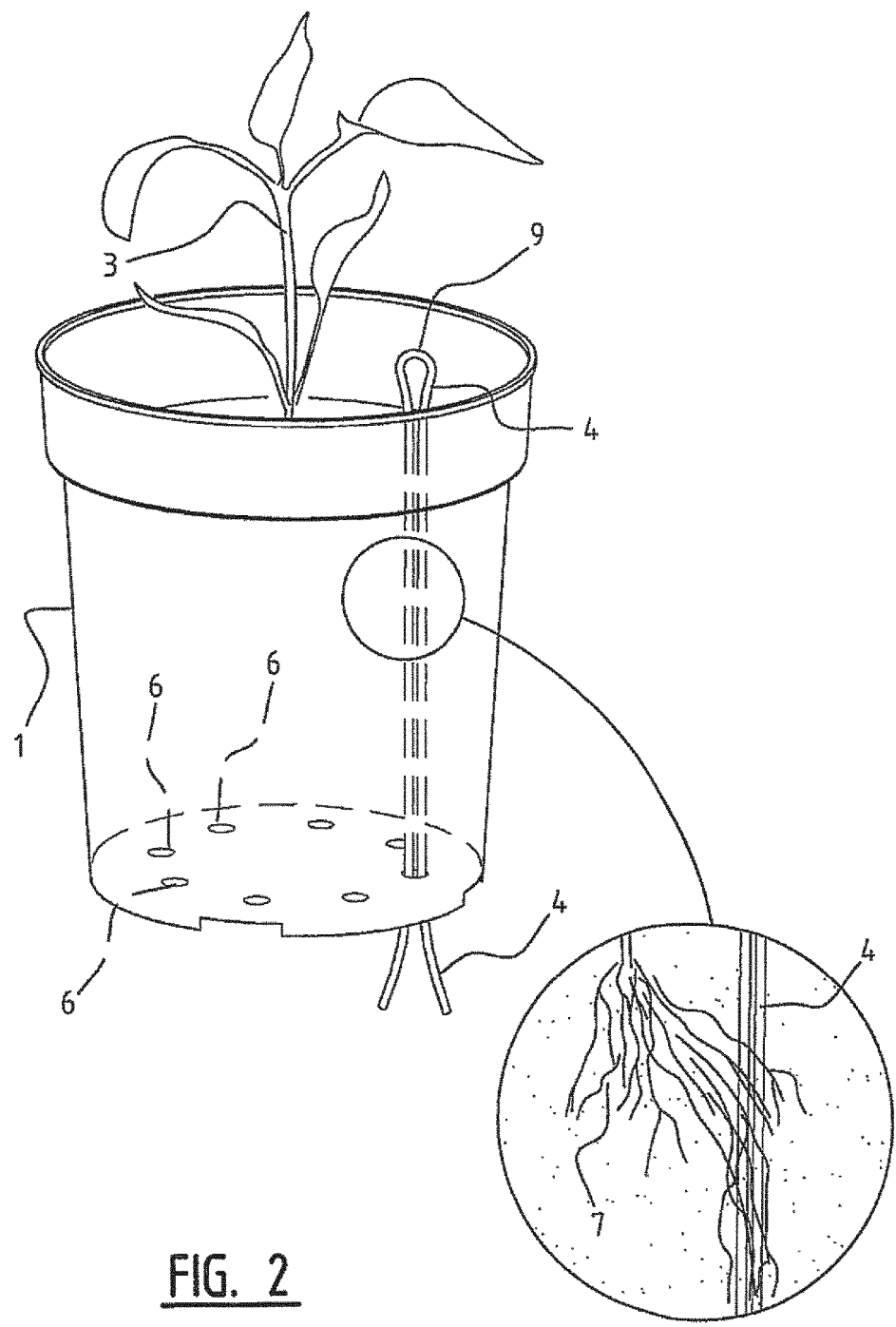
FIG. 2 shows a schematic perspective view of the plant pot of FIG. 1 after insertion of the wick.

In FIG. 2 an intermediate configuration is shown, which results from the actions in FIG. 1 and described herein above.

As a consequence of the feature that the engaging head 8 of the inserting lance 5 engages the wick 4 about midway, after inserting the inserting lance 5 through, the bottom hole 6 all the way up to above the top level of the soil 2 and retracting the inserting wick 5 again, a loop 9 in the wick 4 results. This loop 9 is shown, in FIG. 2, and entails that the wick 4 is folded double—back on itself.

Moreover, in the insert detail in FIG. 2, the practical use of a wick 4 in a plant pot 1 is depicted. The wick 4 is designed for and intended to suck up fluid, such as water, into the soil in the plant pot 1. To this end, a supply of water can be provided underneath the plant pot, in a growing situation following arranging of the wick 4. It has been detected that growth of roots 7, as shown in the insert detail in FIG. 2. Is drawn towards the wick 4 and the supply of water, provided thereby. Consequently, providing additional wicks (as schematically shown in FIG. 1) may be beneficial, to obtain a more homogeneous distribution of roots 7 through the soil 2 in the plant pot 1. However, as a contrary consideration, provision of water to the insides of the plant pot 1 should not be excessive for any specific species of plant. Some species of plants can be provided with practically unlimited amounts of water, whereas other plants can exhibit deterioration of the roots 7, for instance a rotting process, if an excess of water is furnished.

Figure 3:
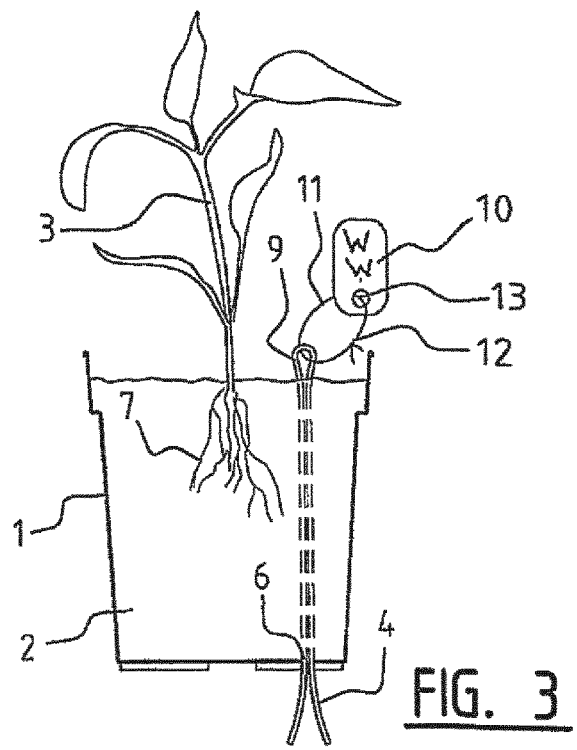
FIG. 3 shows a schematic partially cut away view of the plant pot of FIG. 1 and FIG. 2 with additionally a label.

In FIG. 3 a further feature according to the present invention is shown. The feature relates to a label 10 forming an anchor in the sense of specific embodiments of the present invention, which is arranged on or to the loop 9 in the wick 4. In FIG. 3 the label 10 is connected to the loop 9, using a string 11, which may be tied, into a knot 12. The string 11 may be arranged through the loop 3 and a hole 13 in the label 10. Alternatively, an incision can be arranged in the label from an outside edge thereof to extend through the hole 13. In such an alternate embodiment, the loop 3 of the wick 4 can be forced through the incision to arrange the loop 9 in the hole 13 to connect the label 10 to the wick 4. The label 10 carries an indication of the manufacturer, in the case that of the applicant, Waterwick BV.

Figure 4:
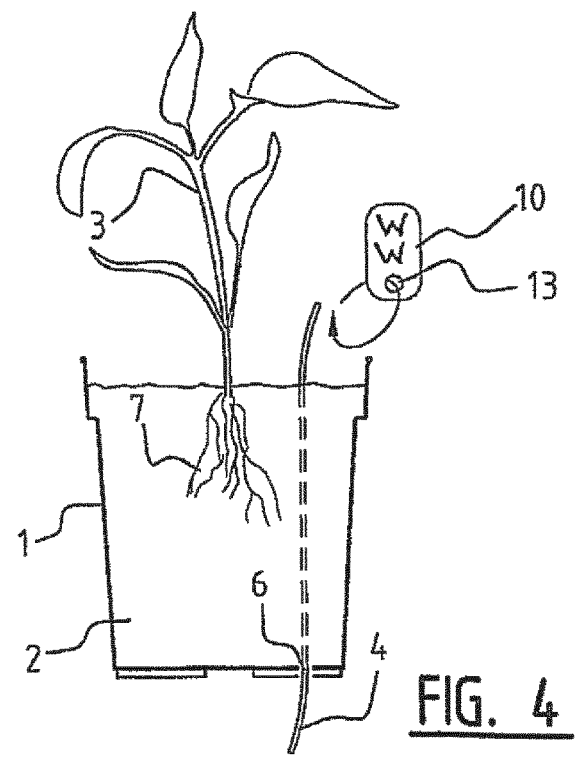
FIG. 4 shows a schematic partially cut away view of an alternative plant pot with an added label.

In FIG. 4 yet another alternate embodiment is shown, wherein a single strand of the wick 4 is inserted, for instance, though not exclusively, through the bottom hole 6 of the plant pot 1 to extend to a height above the top level of the soil 2 in the plant pot 1. The free end of the wick 4 may then be inserted through the hole 13 in the label 10 and doubled back upon itself in order to tie a knot or otherwise close a loop.

With a label, attached to a wick 4 in at least one of the above described manners or any alternative configuration, a double function can be achieved. Information about the plant 3 in the plant pot 1 can be furnished to an end user or consumer on the label 10. Simultaneously, since the label at least also extends in a direction across the slender wick, it may be prevented that the wick 4 in a doubled or singular configuration can sink through the soil 2. In this sense the label—or any alternative element is referred to as an anchor. As a consequence the beneficial effects of such a wick 4, as depicted in the inserted detail in FIG. 2, could be lost. Providing the label 10 to thus form an anchor and arranging the anchor forming label to or on the wick 4 can ensure continued beneficial effect of the wick and simultaneously present an end user or consumer with information about the plant.

Figure 26:
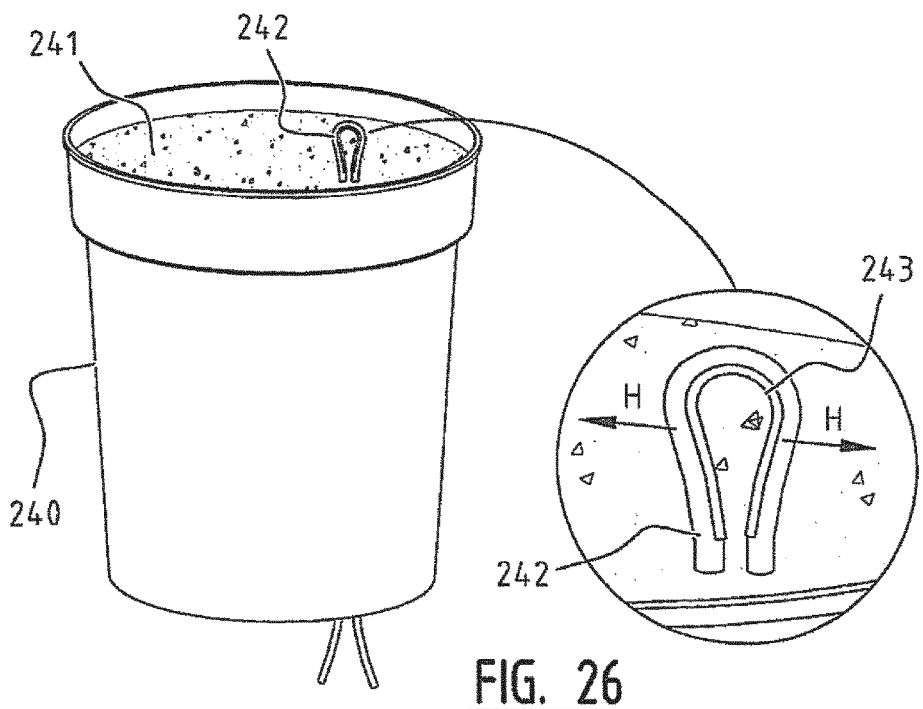
FIG. 26 shows an embodiment in which a loop is formed above the top level of the soil.

FIG. 26 shows a plant pot 240 with soil 241 or any other suitable substrate and a wick 242 inserted therein, for instance in the above described manner. The wick 242 forms a loop above the top level of the soil 241. To avoid the wick from sinking back down through the soil 241, an anchor forming stretching element 243 is provided. The stretching element exerts a spreading force in the direction of arrows P on the loop in the wick 242 (across the direction of the wick and the loop therein), to stretch the loop open and thus prevent the wick 242 from sinking down into the soil 241. Any similar and even non-stretching element may be employed in this manner, and may even for instance provide an attachment for a label. For instance the element 243 may be a locking medallion adapted to prevent the wick from sinking down into the soil 241 and provide a universal base for attaching differing labels thereto. Any element or component that is suitable or intended for keeping the wick 242 from sinking down into the soil 241 or other substrate in the plant pot can and will be referred to as an anchor in the sense of the present, invention.

Figure 5:
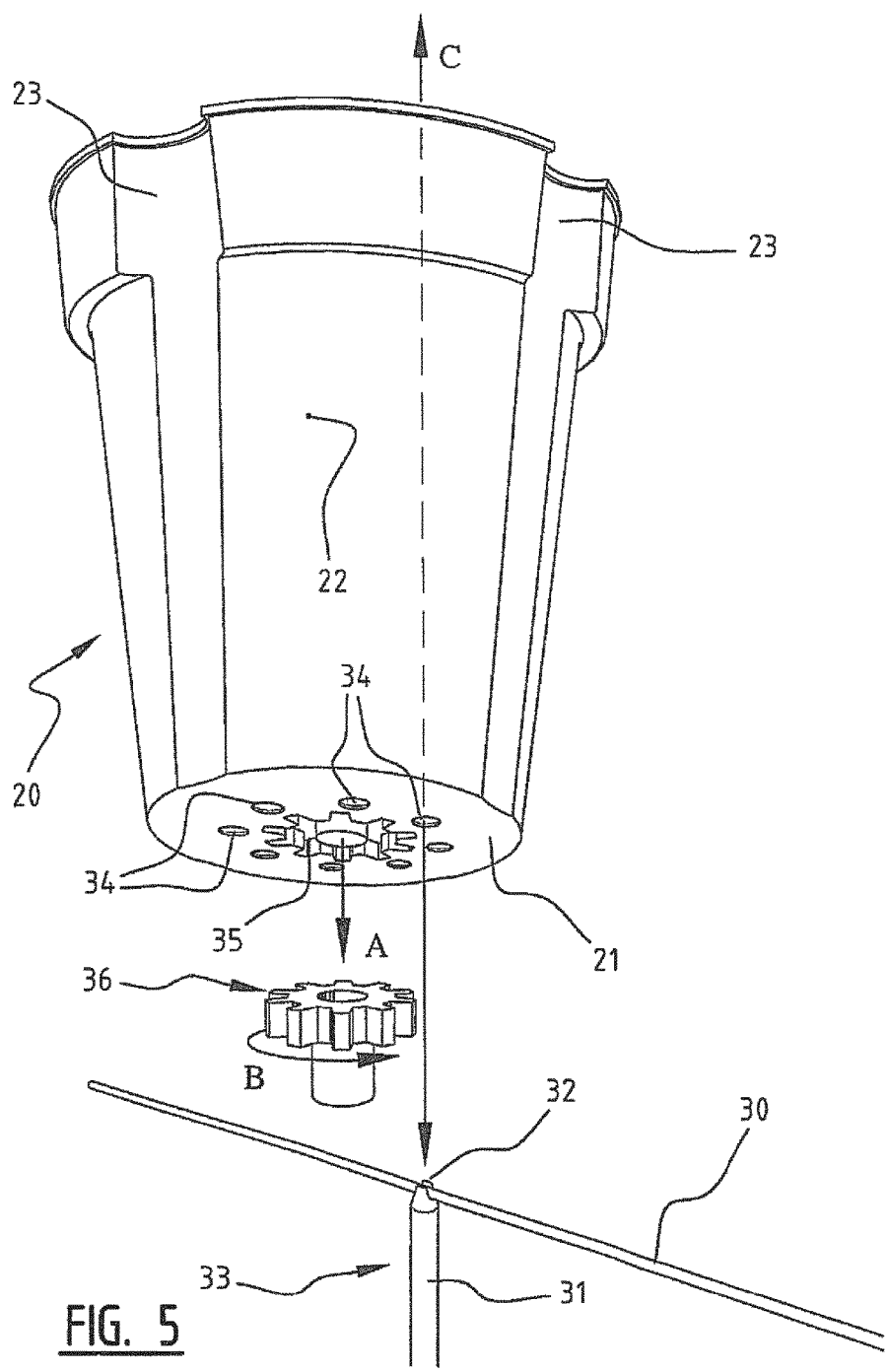
FIG. 5 shows a schematic perspective view of an alternative embodiment of a plant pot and more detailed manner of arranging the wick.

In FIG. 5 a specific plant pot 20 is shown in an embodiment according to the present invention. The plant pot 20 has a bottom 21 and side walls 22. In a top view, such as for instance shown in FIG. 8, the side walls 22 are essentially circular, but exhibit inward oriented indentations 23. Plant pot 20 is designed and intended to foe arranged, in a container, such, as shown in for instance FIGS. 8 and 9. The container 24 can have the appearance, shape and form of essentially a plant pot itself. However, the container would in use normally serve the purpose of providing a water supply, as more specifically depicted in FIG. 9. In the bottom of the container 24 a supply 25 of water is arranged. The water supply 25 in the container 24 can be supplemented via the channels 26 that are defined between the inner wall of the container 24 and the indentations 23 in the side walls 22 of the plant pot 20. Administering additional water for the water supply 25 can be achieved in the direction of arrows G in FIG. 8.

Any one or snore than one of the channels 26 can also accommodate a float or straw 27, of which at least a portion extends into the water supply 25, and which exhibits a desired degree of buoyancy. A straw may be closed at bottom end thereof to impart said desired degree of buoyancy to the straw. A label 28 can be attached to the fee end of the float or straw 27, on which information about the plant can be printed for the end user or consumer. Moreover, the height of the float or straw 27 at any given time is an indication of the water level of the water supply 25 in the container 24. Consequently, during growth, production, transport, offer for sale, or at the home of the end user or consumer, a clear indication can be obtained from the height of the float or straw 27 about the need for supplementing water into the water supply 25 in the container 24.

It is to be noted that specific indicators 29 can be printed or otherwise arranged on the float or straw 27 to furnish a more specific indication of an amount of water needed to bring the water supply 25 up to a desired level. The indicators 29 can be dependent on the type of plant in the plant pot 20. It is to be noted that also in the configuration, according to FIG. 9 a wick 30 is arranged in the plant pot 20, more in particular the wick 30 is arranged in the plant pot 20 before the plant pot 20 is accommodated in the container 24.

In FIG. 5 additional or alternative features for arranging a wick 30 into plant pot 20 are shown, in relation to the description of FIG. 1. Herein, the inserting lance 33 comprises a needle 31 having a U-shaped engaging head 32, which is U-shaped in side view. The wick 30 is to be accommodated in the U-shaped engaging head 32 prior to the needle 31 being driven through any one of the holes 34 in the bottom 21 of the plant pot 20. Again, the inserting lance 33 is driven up through a selected one of the holes 34 in the bottom 21 of the plant pot 20 and retracted after having extended up to at least the top level of the soil 2 in the plant pot 20. Thereafter, the inserting lance 33 is retracted, again following the movements indicated in FIG. 5 with double arrow C.

According to the present invention aligning the inserted lance 33 with a selected one of the holes 34 is achieved in the following manner.

In the embodiment of FIG. 5 the bottom 21 of the plant pot 20 comprises an essentially star-shaped recess 35, which is surrounded by the holes 34, through which the inserting lance 33 may be inserted. The shape of the star-shaped recess 35 corresponds with that of a toothed wheel 36. The toothed wheel 36 is arranged at a stationary height that is simultaneously arranged for rotation in the direction of arrow B (or an opposite direction). Plant pot 20 can be arranged in, the direction of arrow A on top of toothed wheel 36, whereby the recess 35 may accommodated the toothed wheel 36. Consequently, the toothed wheel 36 can be driven in the direction of arrow B (or an opposite direction) such that a selected on of the holes 34 will be aligned with the movement in the direction of double arrow C of the inserting lance 33. Due to the correspondence of the shape of the recess 35 and that of the toothed wheel 36, rotation of the toothed, wheel 36 will also result in rotation of the plant pot 20 to bring any one of the holes 34 into alignment with the inserting direction of arrow C of the inserting lance 33. Consequently, any one of the holes 34 may be a selected, hole, if it can be aligned with the inserting lance 33 in the above described manner first.

The holes 34 in the bottom 21 of the plant pot 20 are arranged in a predetermined configuration relative to the shape and position of the recess 35. Consequently, in this embodiment, a plurality of rotational movements in the direction of arrow B can be executed to align any one of the holes 34 with the inserting lance 33. Thus the amount of rotation may be minimized to align an arbitrary one of the holes and the inserting lance, where the position of each hole is known beforehand through a predefined relation between the toothed wheel 36 and the recess 35 on the one hand and the positions of the holes 34 on the other hand. In the case of a regular shape of the toothed wheel 36 and recess, for instance, the holes may each be arranged between points of the star shape in FIG. 5 and at a predefined distance irons the centre of she bottom of the plant pot (or this may be the case for at least some of the holes). If this relationship is known, the position of each hole and alignment of any hole with the lance will be known to have been achieved at a reached, rotational position of the wheel 36 and therewith the plant pot 20.

The shape of the recess 35 and that of the toothed wheel 36 can be arbitrarily chosen by the skilled person. Of importance in such a choice of shape is the ability to drive the plant pot 20 in a rotational movement in accordance with arrow B in FIG. 5, and simultaneously define positions of the holes 34 in the bottom 21 of the plant pot 20 in order to achieve alignment of any one of these holes 34 with the inserting lance. For instance, the shape of the recess 35 and that of the wheel 36 could be oval, triangular, a pentagram, etc.

It is to be noted that the present embodiment according to FIG. 5 requires some adaptation to the bottom 21 of the plant pot 20. Some plant pots may have central recesses in the bottom thereof. Upright walls of such recesses may have slits, which can be engaged by a specific embodiment of a wheel that can be comparable with the toothed wheel 36 to engage the plant pot in the slits of the central recess rather than to provide a special star-shaped or other particular recess like the one 35 in FIG. 5.

Figure 6:
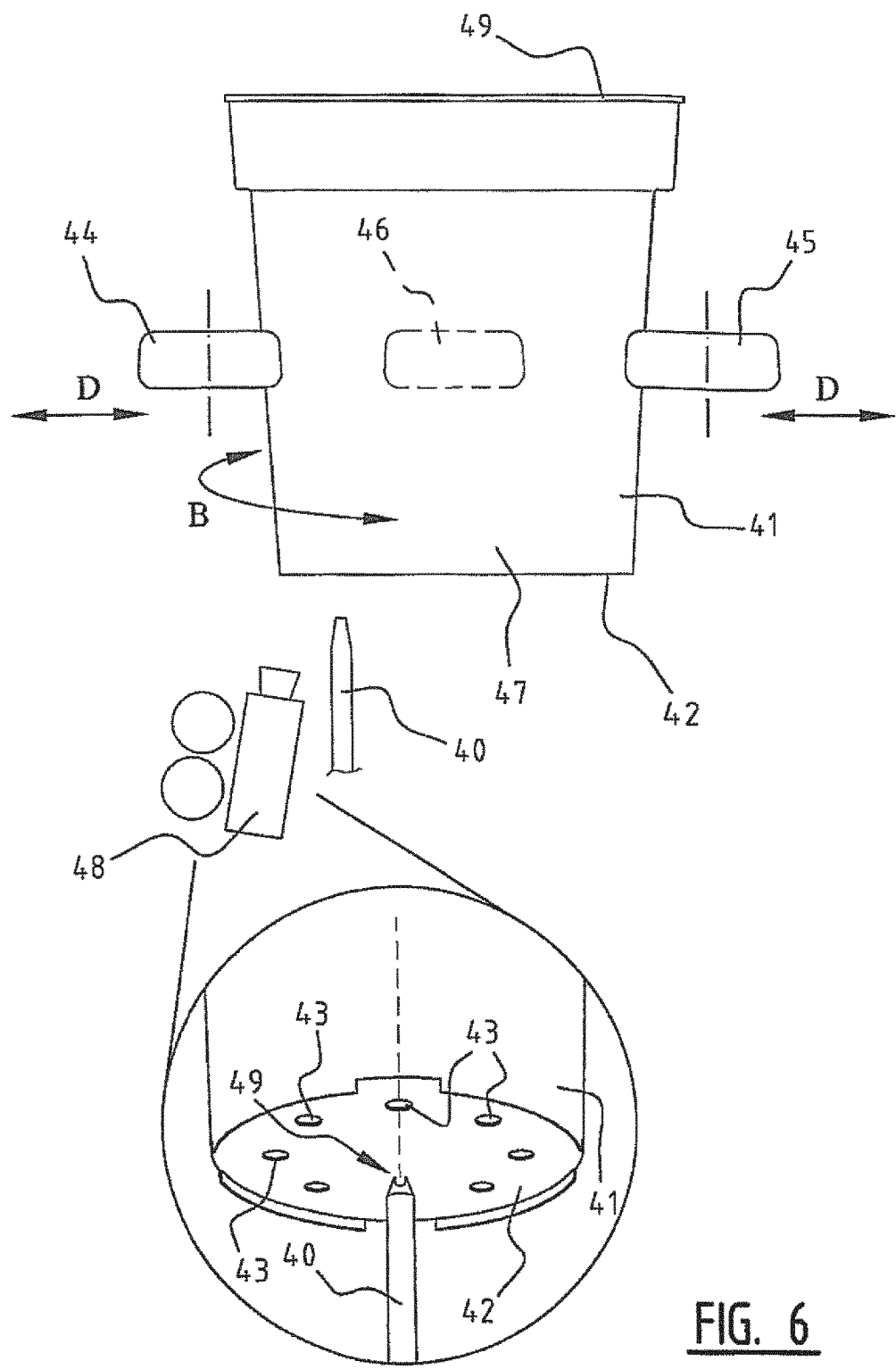
FIG. 6 shows a schematic view of an alternative embodiment relative to FIG. 5 with respect to aligning and arranging a wick in the plant pot.

As yet another alternative embodiment, as shown in FIG. 6, an inserting lance 40 can be aligned to holes 43 in a bottom 42 of a plant pot 41, even without a central recess. In the embodiment that is shown in FIG. 6, running wheels 44, 45 and 46 are distributed around the circumference of the side wall 47 of the plant pot 41. After a plant pot 41 is provided, the running wheels 44, 45 and 46 can be made to abut against the outer service of the side walls 47 of the plant pot 41 by displacement of the running wheels 44, 45 and 46 in the direction of arrows D. By subsequently driving the running wheels 44, 45 and 46, which are evenly distributed around the circumference of the plant pot 41 in a rotational movement of each singular running wheel 44, 45 and 46, a rotation of the plant pot 41 in the direction of arrow B can be achieved. At such a rotational movement in the direction of arrow B of the plant pot 41, a camera 48 or any suitable imaging or vision means can be oriented at the bottom 42 of the plant pot 41, the two determine at which rotational position of the plant pot 41 the inserting lance 40 is aligned with any one and more in particular a selected one of the holes 43 in the bottom 42 of the plant pot 41. When such alignment is detected, the running wheels 44, 45 and 46 are arrested or halted to allow the inserting lance 40 to be inserted into and through the aligned one of the holes 43. With a wick (not shown in FIG. 6) accommodated in the U-shaped engaging head 49, the (not shown) wick can be arranged through the aligned one of the holes 43 and into the soil in the plant pot 41 to achieve a result, much the same as the one shown in FIG. 3. However, in this embodiment, no adaptation of the bottom 42 of the plant pot 41 is required.

It is to be noted here, that also other rotational drives can be employed that do not necessarily engage the outer surface of the side walls 47 of the plant pot 41, but may for instance engage the top rim 49 of the plant pot 41, or yet another alternative, wherein any one of the holes 43 may be engaged to drive the plant pot 41 in a rotational movement to align another one of the holes 43 in the bottom 42 of the plant pot 41.

Figure 7:
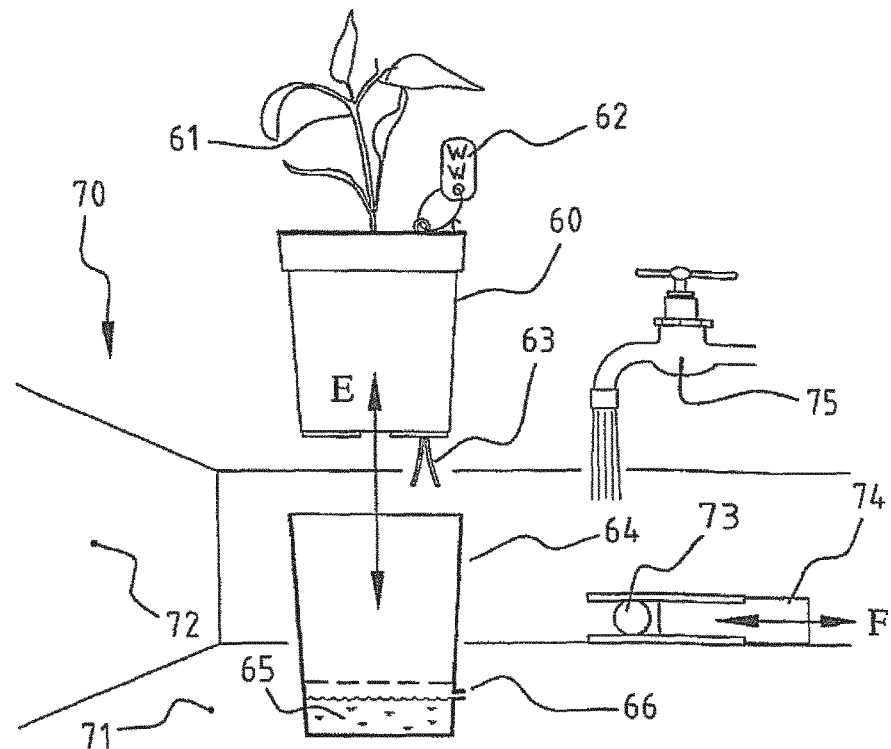
FIG. 7 shows a schematic view of a plant pot and container assembly in use in an ebb and flood based tray.

In FIG. 7 an embodiment of use of a plant pot 60 is depicted in a configuration, also according to the present application for growing the plants 61 in a controlled manner. Plant pot 60 is provided with a wick 63, to which a label 62 is arranged above the top surface of the soil in the plant pot 60. The plant 61 grows in that soil. The plant pot 60 can be accommodated in a container 64, containing a water supply 65. The wick 63 may serve to draw up water from the supply 65 into the soil in the plant pot 60, after the plant pot 60 is accommodated in the container 64 in the direction of double arrow E, after which, a rim 67 of the plant pot 60 rests on the top circumferential edge of the container 64 to keep the bottom of the plant pot 60 above the normal level (depicted in FIG. 7) of the water supply 65. The plant pot 60 may also be extracted from the container 64, for which reason the arrow E is double.

The container 64 comprises an overflow 66, defining a free passage for entry and/or outflow of water into and out of the container 64. The overflow 66 is arranged at a height in the side wall of the container 64 below the bottom of a plant pot 60 accommodated in the container 64. Thus the bottom of the plant pot 60 is above the level of the waiter supply 65 inside the container 64. Thus the remaining height of the container 64 above the overflow 66 corresponds with the height of the plat pot 60, in that the remaining height of the container 64 exceeds the height of the plant pot 60. Further the overflow is at such a height, that the water supply 65 in the container 64 suffices for an intended purpose, such as to sustain growth of a plant in the plant pot 60 via the wick 63 for a predetermined period of time daring development of the plant or for instance to prevent the plant from withering during transport or display for sale. The overflow 66 may be closed using a plug or the like, for instance during transport, to ensure the availability of the water supply 65 for the plant. The assembly of the container 64 and the plant pot 60 would then be transported together in an assembled state thereof.

The container 64 is in the embodiment of FIG. 7, arranged in a tray 70 comprising a bottom 71 and side walls 72. In one of these side walls 72 an outflow 73 is provided, which in a simple embodiment can entail no more than a simple hole.

The outflow 73 can be closed, using a shift plate 74 or any suitable means. The shift plate 74 is movable in the direction of double arrow F to either close the outflow 73 or allow free passage of water from the tray 70. Further, the tray 70 is combined with a water tap 75 to add water into the tray 70. Using the water tap 75, the water level in the tray 70 can be increased to above the overflow 66, and consequently also within the container 64 via the overflow 66. The soil in the plant pot 60 can thereby be fully saturated. Thereafter, the water tap 75 can be closed and the shift plate 74, forming a type of valve, can be opened to free the outflow 73 and lower the level of water in the tray 70. At such a time, also the water level within the container 64 will lower, after which water supply to the soil in the plant pot 60 will be achieved mainly using the wick 63. This increasing and lowering of a water level within the tray 70 is schematically represented, that is generally referred to as an ebb and flood system, which has proven useful and reliable for regulating humidity of the soil in plant pots, although this is not previously been achieved using a combination thereof with a wick 63 and/or with a container like the container 64 in FIG. 7.

Figure 8:
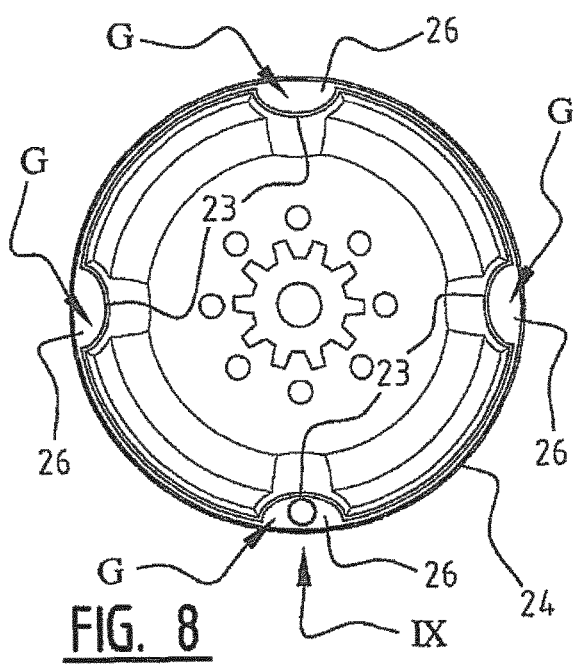
FIG. 8 shows a schematic top view of the plant pot and container assembly of FIG. 7.
Figure 27:
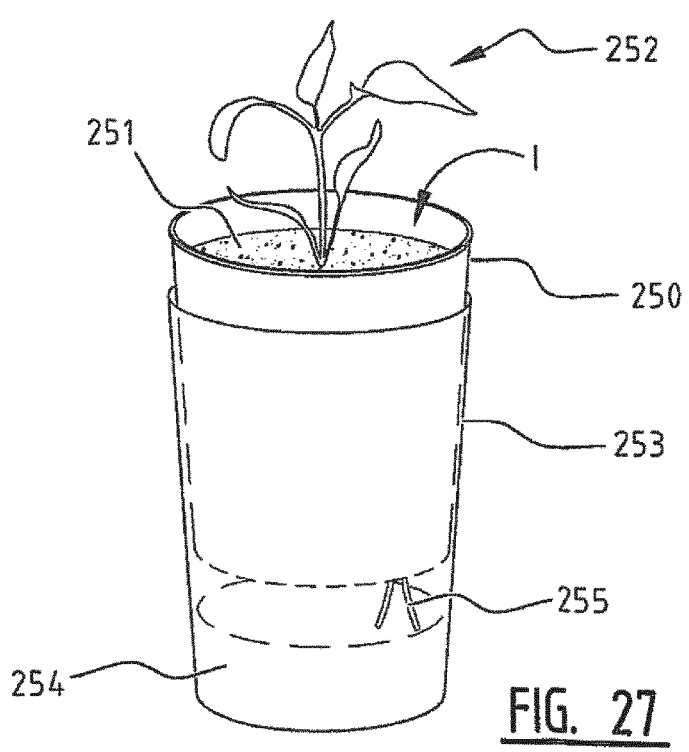
FIG. 27 shows an alternative relative to FIG. 8.

FIG. 27 shows an alternative with a conventional pot 250 without the indentations 23 of the pot in FIG. 8 but with a wick 255 and an overpot 253 without an overflow instead of the container 24 of FIG. 8. In this alternative of FIG. 27, the pot 250 contains soil 251 for a plant 252, to which water may be supplied in the direction of arrow Q. Since there are no indentations 23, no channels are available to supply water to lower parts of the overpot 253. Water then trickles down through the pot 250 and is caught in overpot 253 to form a reservoir at the bettors thereof. At the bottom of the pot 250, a wick 255 extends into water 254 in the bottom of overpot 253, to suck or draw up water for the plant 252. The plant 252 may be transported in the plant pot 250 and in the overpot 253, but intended and envisaged use is for the plant in the pot 250 to be taken out of the overpot 253 for transport, as a consequence of which the overpot stays at the grower.

Figure 9:
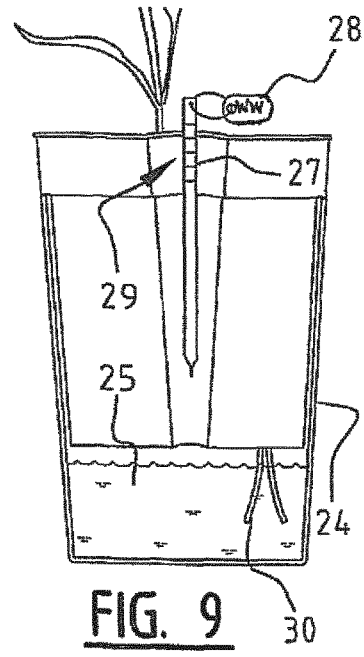
FIG. 9 shows a schematic, partially broken away side view of the plant pot and container assembly of FIG. 7 and FIG. 8 with additionally a water level indicator.
Figure 10:
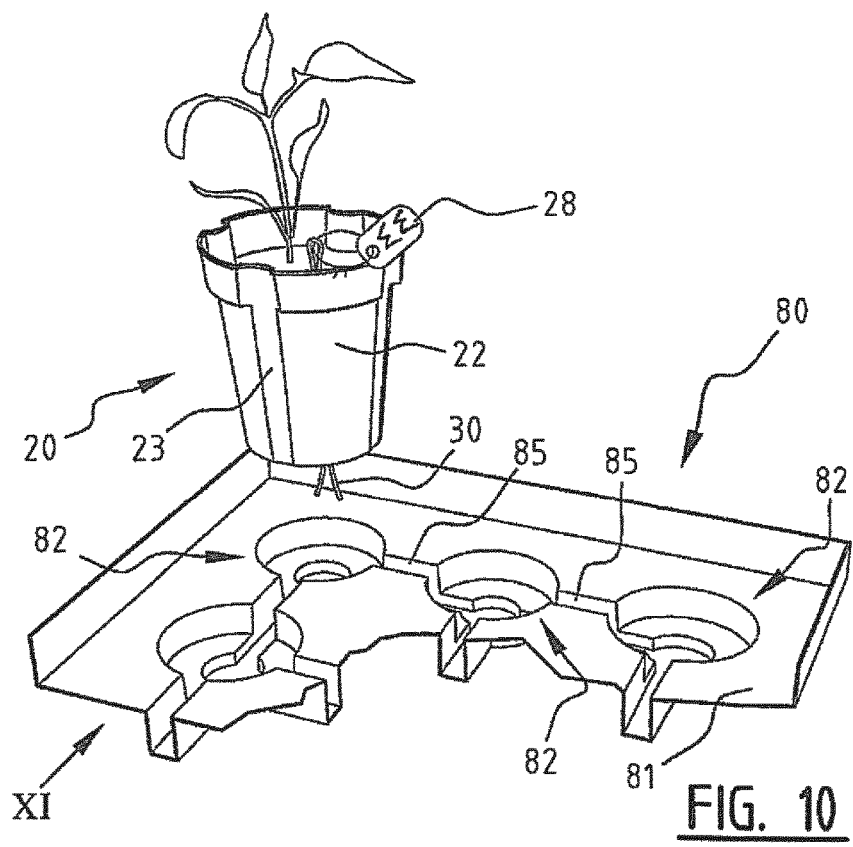
FIG. 10 shows a schematic perspective view of a plant pot much like the one in FIGS. 5, 8 and 9 in an accommodating tray suitable for growing, transporting and displaying for sale of plants.
Figure 11:
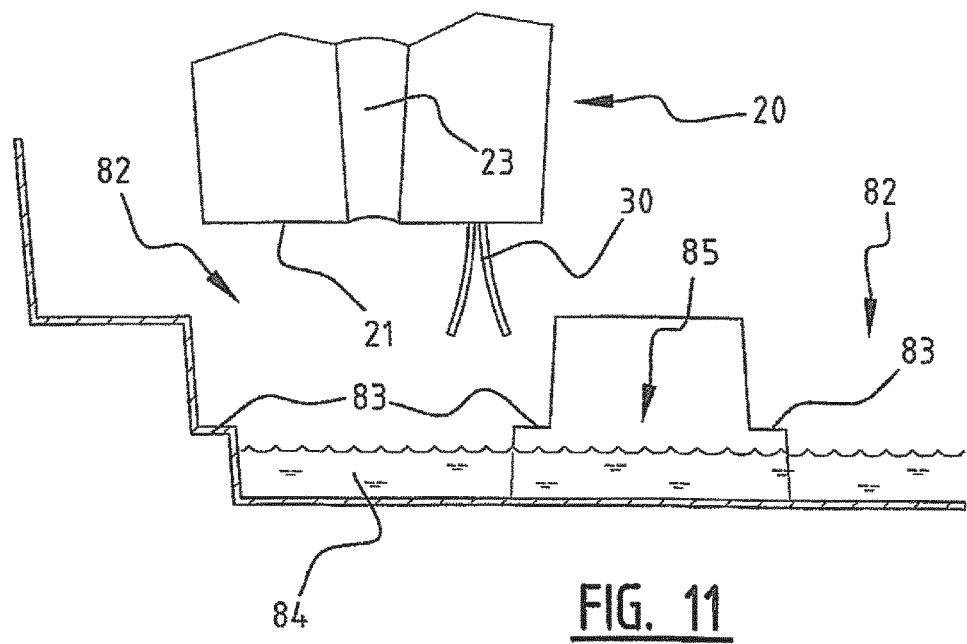
FIG. 11 shows a schematic side view along arrow XI in FIG. 10.

In FIG. 10 and FIG. 11 a tray 80 is shown in combination with a plant pot 20, which for the sake of the exemplarily embodiment here is the same plant pot as the one depicted in FIGS. 5, 8 and 9. Tray 80 has an articulated bottom, having recesses 82, which has a shape and form to accommodate the bottom 21 of a plant pot 20 in a preferably close fitting manner. Each recess 82, as shown in FIG. 11, comprises a shoulder 83, which acts as a support for the plant pot 20, when the bottom 21 of the plant pot 20 is inserted into an intended, one of the recesses 82.

The shoulder 83 surrounds a further depression 84, which acts as a reservoir for water when the plant pot 20 is accommodated in the recess 82, where the wick 30 will extend into this further depression 84 to draw up water from the reservoir formed by the farther depression 84.

Between neighbouring recesses 82 and further depressions 84 in the articulated bottom 81 of the tray 80 channels 85 are defined. The channels 85 allow for distribution of water over the recesses 82 and further depressions 84, to which end the channels have a depth corresponding with the lowermost portions of the further depressions 84, so that water is distributed over the further depressions 84, even when plant pots 20 are accommodated in the recesses 82. It is to be noted that the indentations 23 in the side walls 22 of the plant pot 20 in a proper orientation of the plant pot 20 in the recess 82 of the tray 80 allow water to be supplemented, into the reservoir formed by the further depression 84.

Consequently, water can be administered to the plants directly, using specifically watering means or by simply spraying or sprinkling water into the tray 8. For such wide spread watering, a watering boom (not shown) can be employed, whereby a considerable simplification for watering plants can be achieved in this embodiment.

The tray 80 of FIG. 10 or FIG. 11 can be used for growing plants or maybe even for transporting plants in the plant pots 20. Such frays 80 may even be used for display purposes.

Likewise, FIG. 12 and FIG. 13 show a further example of a tray 90 having a bottom 91 and upright wall parts 92, surrounding the bottom 91. The bottom 91 of the tray 90 is provided with protrusions 93 in two rows along the longer sides of the tray 90. The protrusions define an intermediate space, into which a separator beam 94 can be inserted. The separator beam 34 is an A-profile, as shown in the insert detail of FIG. 12. The upright profile part 35 of the T-shaped separator beam 94 can be inserted into the space defined between two neighbouring protrusions 93, while simultaneously the crossbar profile part 36 of the separator beam 94 defines an intermediate space between neighbouring plant pots on opposite sides of the separator beam 94. As shown in FIG. 13, a relatively large plant pot 98 can stably be arranged between a side wall 92 of the tray and a separator beam 94, inserted therein, whilst smaller pots 99 can be safely and stably arranged between neighbouring separator beams 94. Even relatively small plant pots 97 can be stabile transported and even displayed at a point of sale, accommodated between a side wall 32 of the tray 90 and an inserted separator beam 94.

Figure 14:
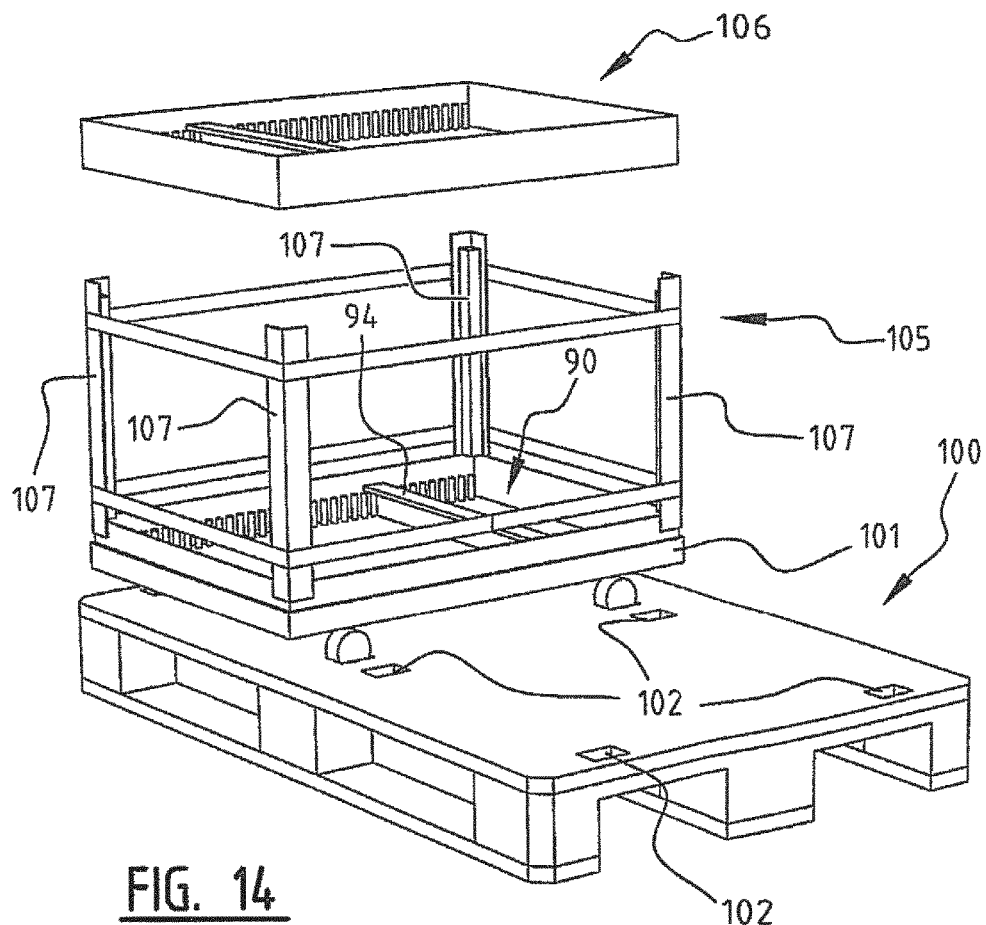
FIG. 14 shows a perspective schematic view of a stack of trays with a collapsible structure between subsequent trays in the stack, wherein the trays are suitable for at least growing plants in pots and the stack is suitable for growing, transporting and displaying for sale of plants.
Figure 15:
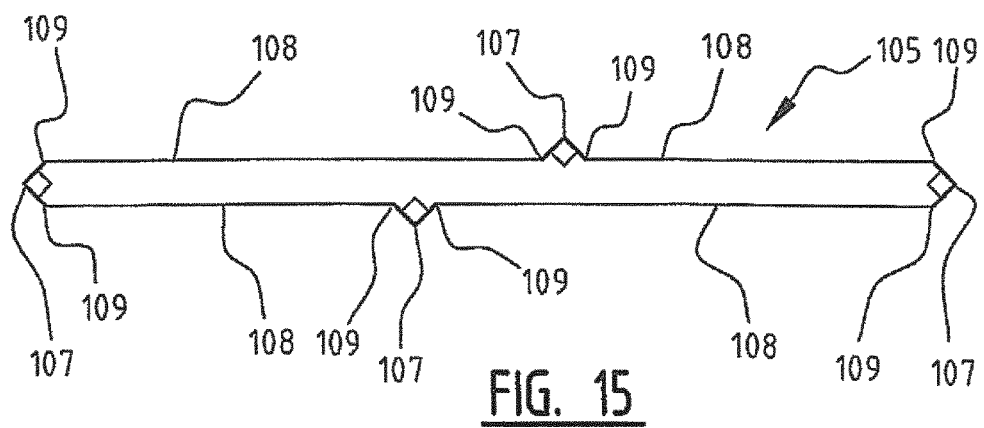
FIG. 15 shows a schematic side view of a collapsible structure in a collapsed state.

In order to emphasize the usability of separable types of trays in combination with plant pots for growing plants, transporting the plant pots and offering the plants for sale in the form of a display, FIGS. 14 and 15 show that a wheeled base 101 can be arranged on top of a pallet 100, more in particular with the wheels of the wheeled based 101 sunk into holes 102 in the tops the holes 102 can be arranged all through the top surface of the pallet 100, but slight depressions may also serve the purpose of immobilizing the wheeled base 101 on top of the pallet 100.

The wheeled base 101 forms a support for a tray, for instance the tray of FIGS. 12 and 13. Such a tray 90 may be embodied from sturdy plastic, which is sufficiently strong to carry a collapsible frame 105 on the corners thereof. The collapsible frame 105 is shown in FIG. 15 in a collapsible state. The collapsible frame 105 comprises four uprights 107, which correspond in position and orientation with the corners of the tray 90, to be arranged thereon. The uprights 107 are mutually connected by bans or strips 108. To achieve the collapsed situation of FIG. 15 in an embodiment where strips 108 are employed so connect uprights 107, hinges 109 should be arranged between the uprights 107 and the strips 108. As an alternative for the hinges 109, connecting elements of flexible material can also be employed or any other suitable alternative.

With the collapsible frame in an expanded configuration as shown in FIG. 14, the collapsible frame 105 forms a support for a further or additional tray 106 which can essentially be a tray as the one on the wheeled base 101 or at least of the same type.

The length of the uprights of the collapsible frame 105 may be selected in accordance with the expected height of plants to be transported in plant pots to be arranged on the bottom of the trays 90, 106. A further collapsible frame 105 can be added on top of the further tray 106, to continue stacking trays and increasing the height of the thus created, assembly. It is to be noted, that plants can be grown in pots, arranged in trays 106, to be stacked using collapsible frames 105 (or similar devices) for transport. After reaching a destination or point of sale, an assembly comprising a wheeled base 101 and the stack of trays 90, 106 and intermediate collapsible frames 105 can be taken off the pallet 100 to be driven to a display position. Consequently, end users or consumers can take plants in plant pots out of the trays 90, 106 to the checkout counter for payment thereof. Such a display using grow trays 90, 106 can then be returned to a grower to be re-used. For this purpose, the frames 105 are preferably collapsible or can at least, to some degree, be disassembled to save transport space during a return, journey.

Figure 28:
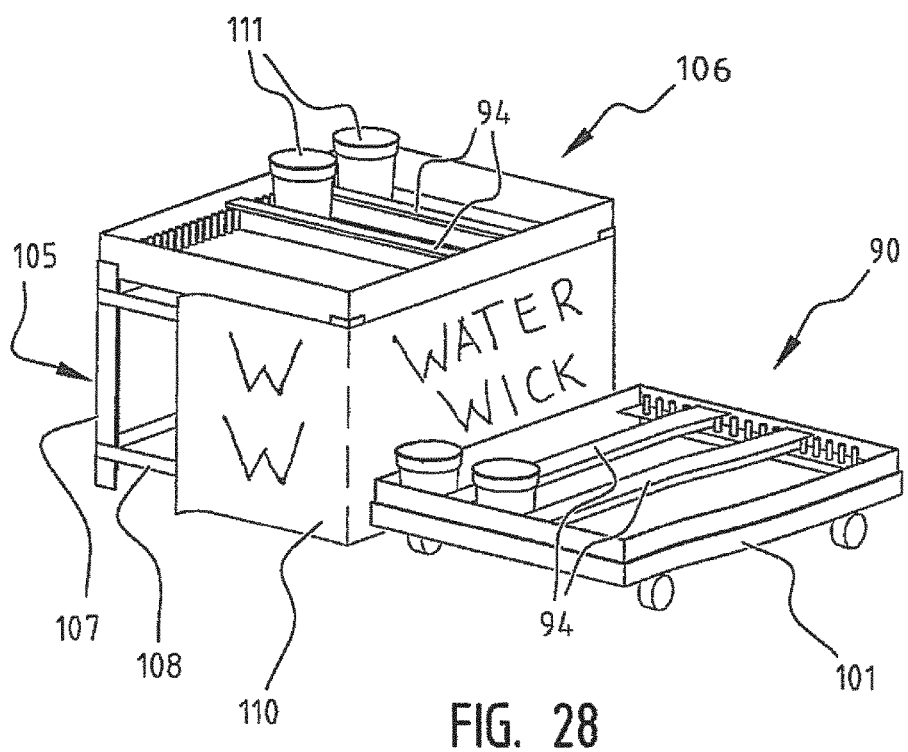
FIG. 28 shows an arrangement for display for sale of plants in plant pots that can be formed from the assembly of FIGS. 14 and 15.

In FIG. 28, the assembly in FIG. 14 in use to display plants on offer for sale is shown. Plant pots 111 are arranged in trays 90, 106, and held upright in a sturdy manner, for instance using the separator beams in FIG. 14. The collapsible frame 105 with the higher tray 106 thereon has been taken off the lower tray 109, and been set down on a ground besides the wheeled base 101 carrying the lower tray 90. A banner 110 is then wrapped around and arranged, on the collapsible frame 105 (for instance using velcro connections or the like) to enhance the attractive appeal of the thus formed configuration. The banner 110 may be printed with plant information, grower information, a picture of the plants on offer for sale, a solid colour or the like. In the example of FIG. 28, an identification of the manufacturer is shown, in particular the name of the present applicant, Waterwick BV. Although no plants are shown in FIG. 28, the plant pots 111 will contain plants in practice.

Figure 22:
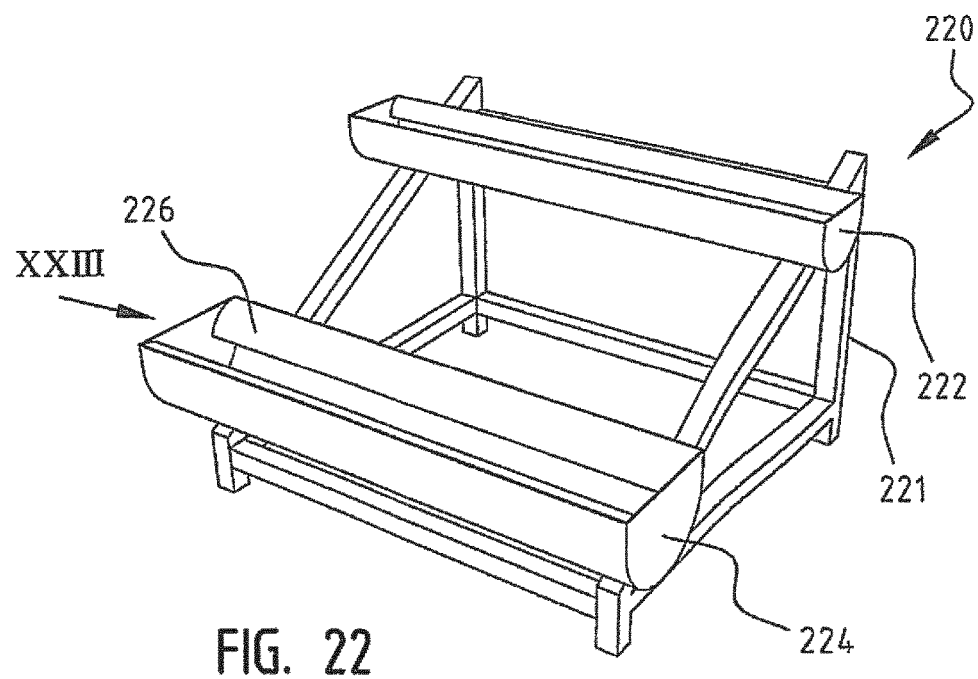
FIG. 22 shows a schematic perspective view of a system adapted to accommodate plant pots with a wick, for instance for display plants for sale.
Figure 23:
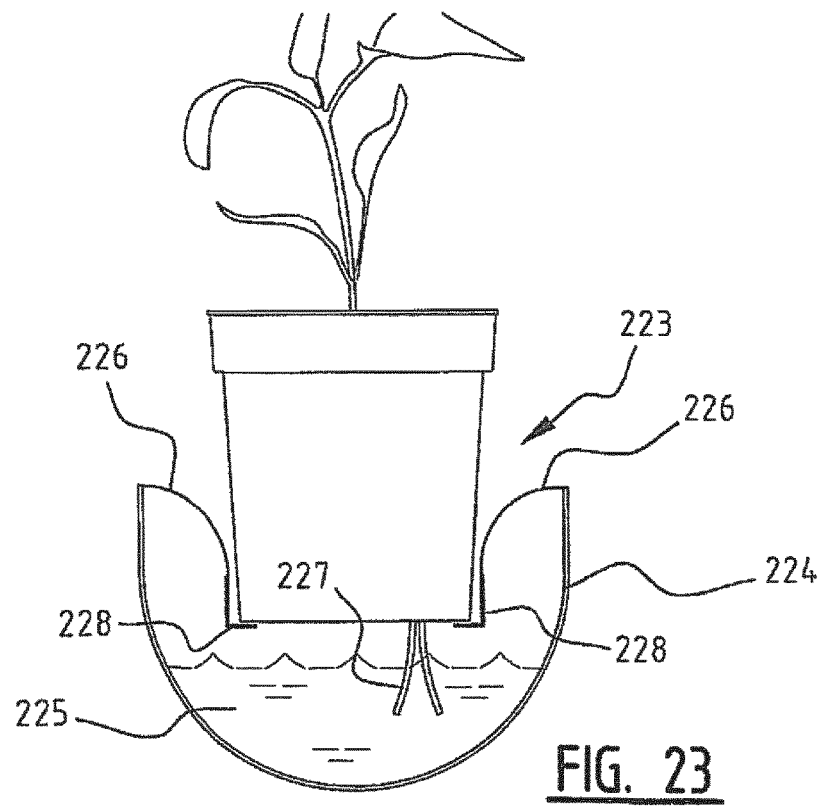
FIG. 23 shows a cross sectional schematic side view along arrow XXIII in FIG. 22.
Figure 24:
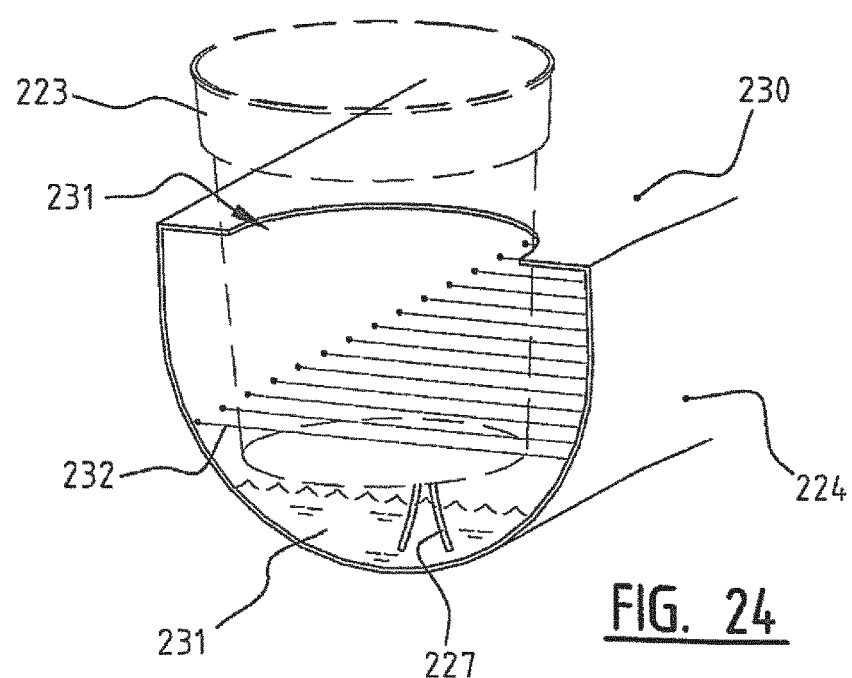
FIG. 24 shows a schematic perspective view of an alternative configuration relative to FIG. 23.

In FIGS. 22, 23 and 24 a display and transport device 220 is shown, comprising a preferably collapsible frame 221 and a plurality of trough-like supports 222, 224 for accommodating plans pots 223. On the frame 221, trough-like supports of different dimensions can be arranged. For instance, the higher trough-like support 222 can be relatively small, especially in relation, to the lower arranged trough-like support 224, where the higher support 222 is intended for smaller plant pots 223 and consequently also smaller plants, than the bigger, wider and deeper trough-like support 224, which is lower down on the frame 221.

At a point of sale, water 225 can be added to the support 222 or 224, to accommodate a plant pot 223 with the bottom thereof submerged, or at least a wick extending from the bottom of the plant pot 223 into the water 225.

The supports 222, 224 are provided with resilient flaps along the edges thereof, which resiliently press against a plant pot 223, when inserted into or on the supports 222, 224. The resilient forces exerted by these flaps 226 serve to keep the plant pot 223 in FIG. 23 upright. In FIG. 23, at the free ends of the resilient flaps 226 angled carrier elements 228 are provided to support plant pots 223 above the level of water 225.

The resilient flaps 226 may be replaced by configurations that could resemble cup holders or the like, to insert the bottom of plant pots 223 therein to submerge only the wick 227 extending from the bottom of the plant pots 223 in the water 225, or to at least allow the wick 227 to be in contact with the water 225. In FIG. 24 a cover 230 is arranged over the trough like support 224, where holes 231 are arranged in the cover 230. Additionally or alternatively, the trough like support 224 as shown in FIG. 24 may comprise a grating 232 or the like to support above the top level of the water 225 the bottoms of plant pots 223 arranged therein.

Figure 25:
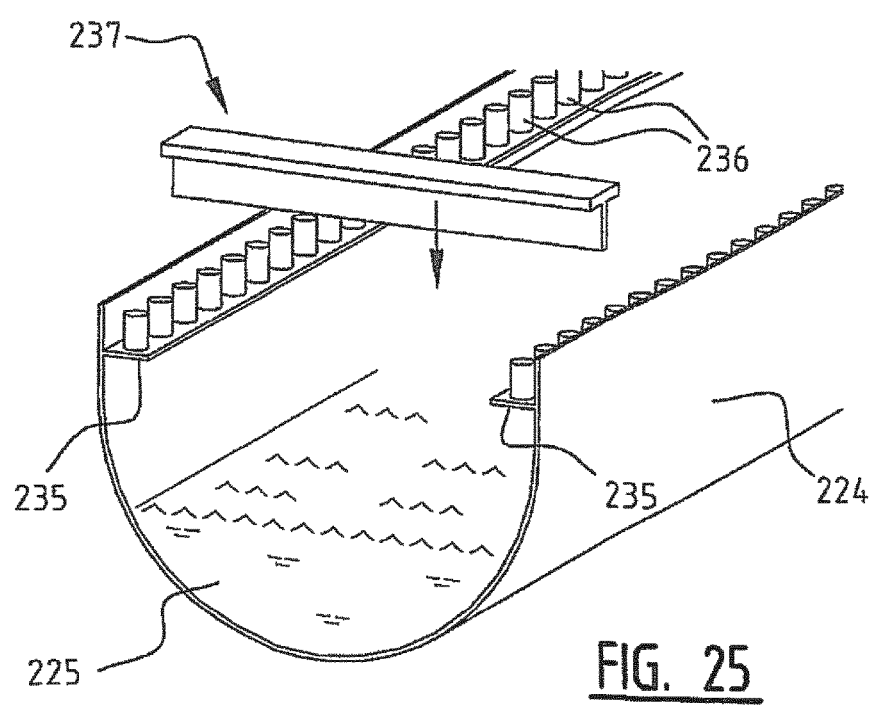
FIG. 25 shows a further alternative embodiment exhibiting similar features relative to trays in FIGS. 12 and 13.

In FIG. 25, an embodiment is shown exhibiting similar features as a tray in FIGS. 12 and 13, where the trough like support 224 comprises shoulders 235 carrying protrusions 236, between which T-shaped profiles 237 can be inserted to define there between a predetermined distance corresponding with plant pot sizes, to support plant pots of differing or varying sizes adjustably, in particular under a rim thereof.

Figure 29:
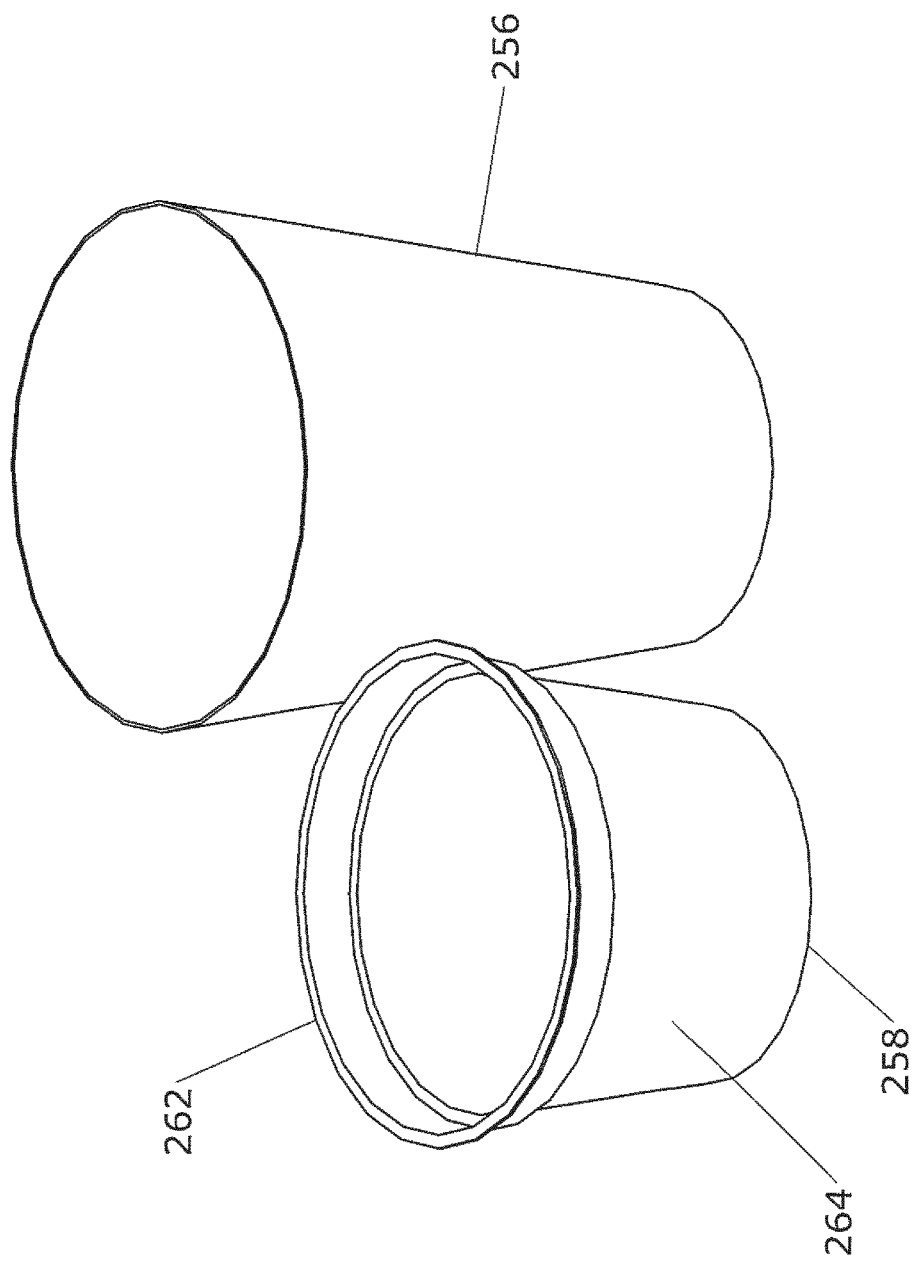
FIG. 29 is a perspective view, showing still another embodiment of a plant pot and corresponding container.
Figure 30:
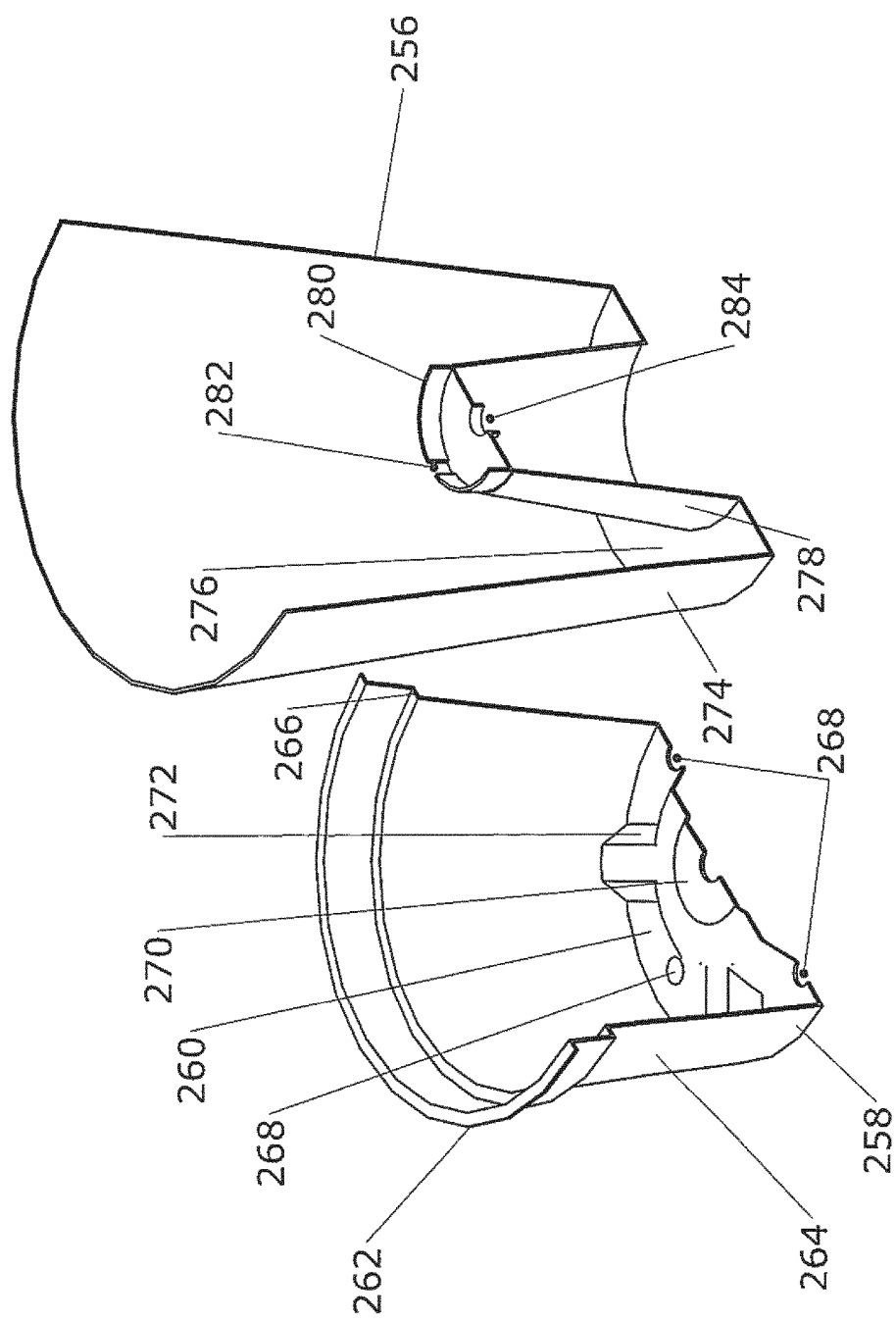
FIG. 30 is a perspective view with a cutaway, showing internal details of the plant pot and container shown in FIG. 29.

FIGS. 29-36 illustrate still another embodiment of a plant containment system that is well-suited for use with an ebb and flood system or other watering arrangement. FIG. 29 shows plant pot 258 and corresponding container 256. FIG. 30 shows a cutaway view in which the plant pot and container of FIG. 29 have been cut in half to reveal internal details. The embodiments of the plant pot and container shown in FIGS. 29 and 30 share many features in common with the embodiments shown in FIGS. 7-9.

For example, plant pot 258 includes bottom 260, side wall 264, side step 266, and circumferential top flange 262. It may or may not include channels 26, and in fact the particular version shown in FIG. 30 does not include these channels. Bottom 260 opens into a series of holes 268.

Stiffening ribs 272 are preferably added between raised central portion 270 and side wall 264 in order to stiffen the bottom.

Container 256 includes bottom 276 joined to side wall 274. It also includes an overflow that allows water into and out of the container. The flow of water through, the overflow is controlled in the invention by a valve (described in more detail subsequently). The presence of this valve is in fact a significant component in the present invention. The overflow and valve may be located in any suitable position in the container, for instance the overflow may be located as shown in FIG. 7 and additionally relative to the embodiment of FIG. 7 a plug or valve may be provided in the overflow 66 to allow a grower or user to selectively open or close the overflow 66. In the embodiment of FIG. 30, however, the overflow 284 is located in a raised base part of the bottom of the container. The raised base part has the shape and form of a central tower 278. Central tower 278 extends upward from bottom 276, and overflow 284 is located in the upper portion of this central tower.

Support ring 280 surrounds overflow 284. It opens into one or more gaps 282, through which water can flow. In reviewing the geometry shown in FIG. 30, those skilled in the art will realize that the position of overflow 284 and gap 282 define a reservoir of retained water within container 256. Once the water in the container reaches this level, any additional water will flow out through overflow 284. Overflow 284 may also be used to admit water to the container, such as when the container is placed in an ebb and flow irrigation system.

Figure 31:
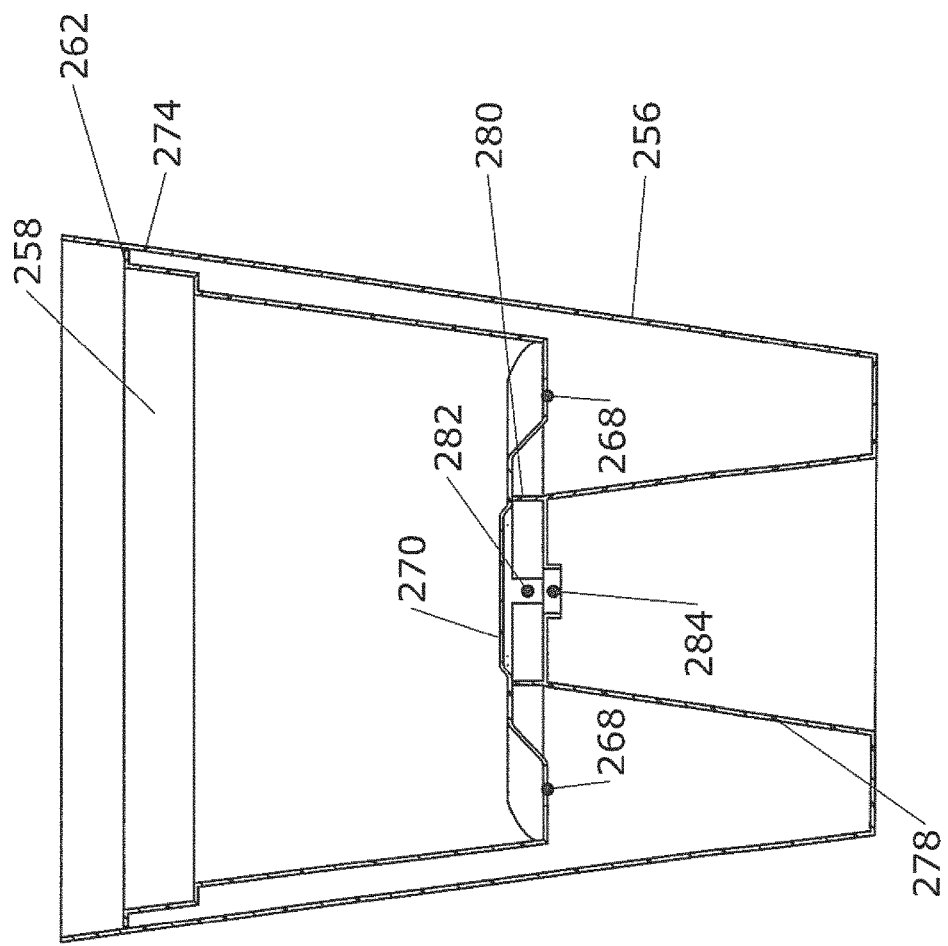
FIG. 31 is a sectional elevation view, showing an assembly of the plant pot and the container.

FIG. 31 shows a sectional elevation view through an assembly of plant pot 258 and container 256. The reader will observe how raised central portion 270 rests on support ring 280. The reader will also note how top flange 262 fits inside the tapered side wall 274 of container 256.

The result is a stable assembly of the plant pot within the container. The height of central tower 278 determines the height of overflow 284 and ultimately the amount of water that will be retained within container 256.

Figure 32:
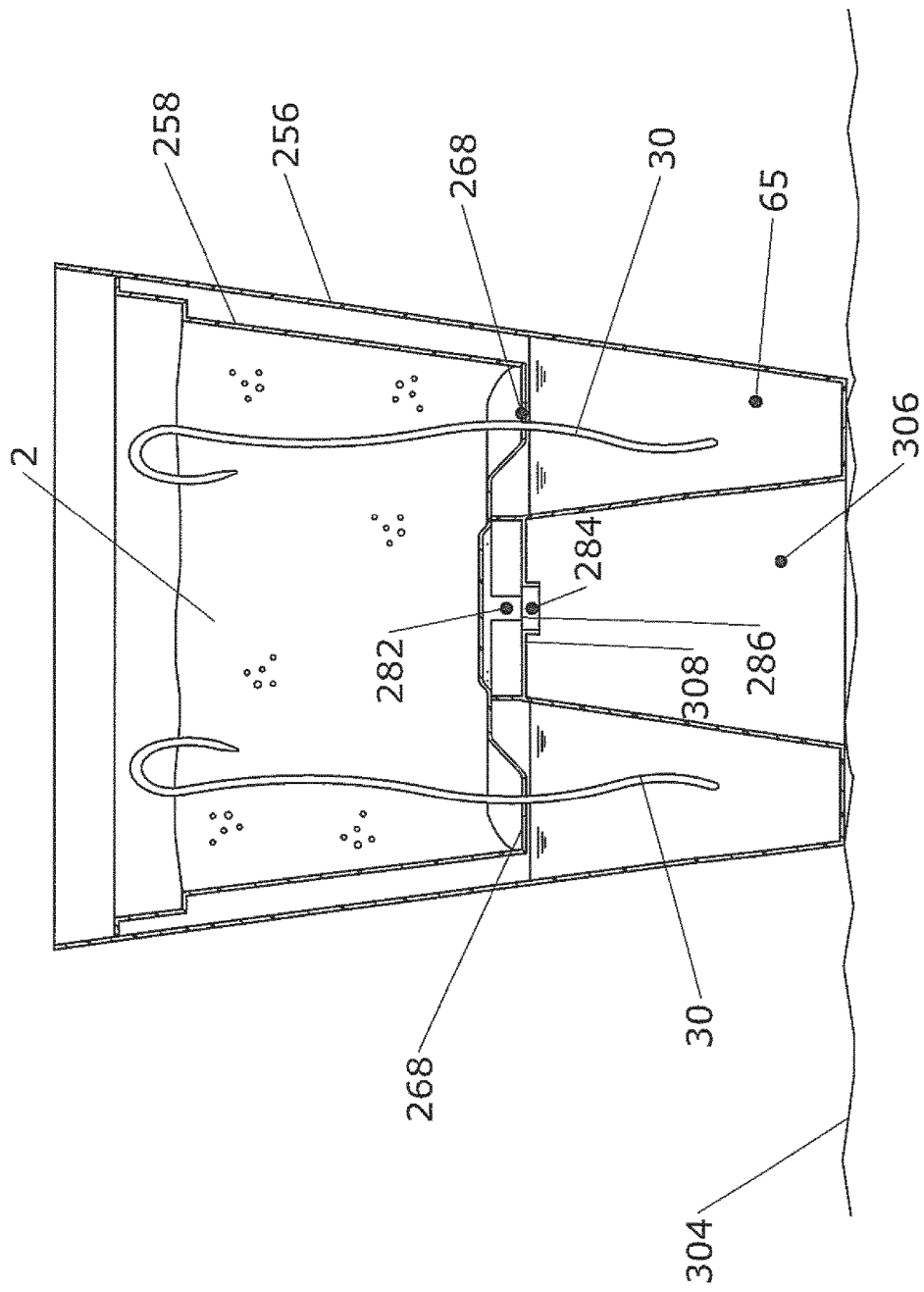
FIG. 32 is a sectional elevation view, showing the assembly of FIG. 31 with the addition, of soil and a pair of wicks.

FIG. 32 shows the same assembly of plant pot and container in a configuration that is actually used for growing a plant. Soil 2 has been added to plant pot 258. One or more wicks 30 are preferably added as well. As for the prior examples, a portion of each wick lies within the plant pot and a portion extends through a particular hole 268 and down into water supply 65 contained in container 256.

Container 256 sits on floor 304, which is typically rough concrete. The operation of the assembly in an ebb and flood system may be understood with respect to FIG. 32. The assembly shown will often be one of many such assemblies placed in a tray 70 such as shown in FIG. 7. The tray surrounding the assembly is flooded to a level above overflow 284 and the lowest portion of gap 282 (The bottom of gap 282 is actually coplanar with the upper portion of horizontal wall 308 in the example shown). Water seeps under the bottom of container 256 and floods central cavity 306 (This is true even when the container is placed on a smooth metal surface, as even in that case the water will seep through into central cavity 306). The water then flows in through overflow 284 and gap 282. The water then floods the annular recess in the container surrounding central tower 278.

The water level within the assembly will continue to rise until it reaches the level within the surrounding tray of the ebb and flood system. An outflow opening for the ebb and flood tray will, be opened at some point and the water surrounding the plant pot and container will recede. Excess water within the assembly will flow out through gap 282 and overflow 284 until the water within water supply 65 is level with the lowest portion of gap 282 (which, in this example, is coplanar with horizontal wall 308 and overflow 284. The lowest obstruction between the water in water supply 85 and the overflow is labeled as overflow level 286. Overflow level 286 constitutes a "defined overflow level" for the assembly shown. The term "defined overflow level" means a level of water resulting in the container when the container is flooded, to a level above that shown in FIG. 32 and the water surrounding the container recedes. The excess water in the container will, flow out until it reaches overflow level 268, at which point it will stop flowing out.

Water within water supply 65 is wicked up into soil 2 by one or more wicks 30, as described previously. The reader will thereby appreciate that water added to the assembly will eventually come to the defined overflow level (overflow level 286). If more wafer is added, it will simply run out overflow 284.

The operation of the assembly has been described with respect to an ebb and flood system. However, it will function well with many other types of watering systems. For instance, the assembly functions well where a user simply pours water into the open top of the plant pot. If too touch water is added, the excess will run out overflow 284 and overflow level 286 will be established. The same level would be established by using a tube-based irrigation system.

The reader will thereby appreciate the advantages of locating overflow 284 in a central tower in the container. The aesthetic appeal of the assembly is not diminished by the overflow since it is not visible, yet the functionality of the overflow remains intact.

In some instances, however, the overflow is undesirable. One example is during the shipment of the assembly to a point of sale. The grower fills water supply 65 to a level as shown in FIG. 32. This level is preferably calculated to provide the plant with a suitable water supply for the anticipated duration of shipment. However, during the motion inherent in the shipping, a significant percentage of the water may "slosh" out through overflow 284. It is therefore desirable to provide a seal for the overflow.

Figure 33:
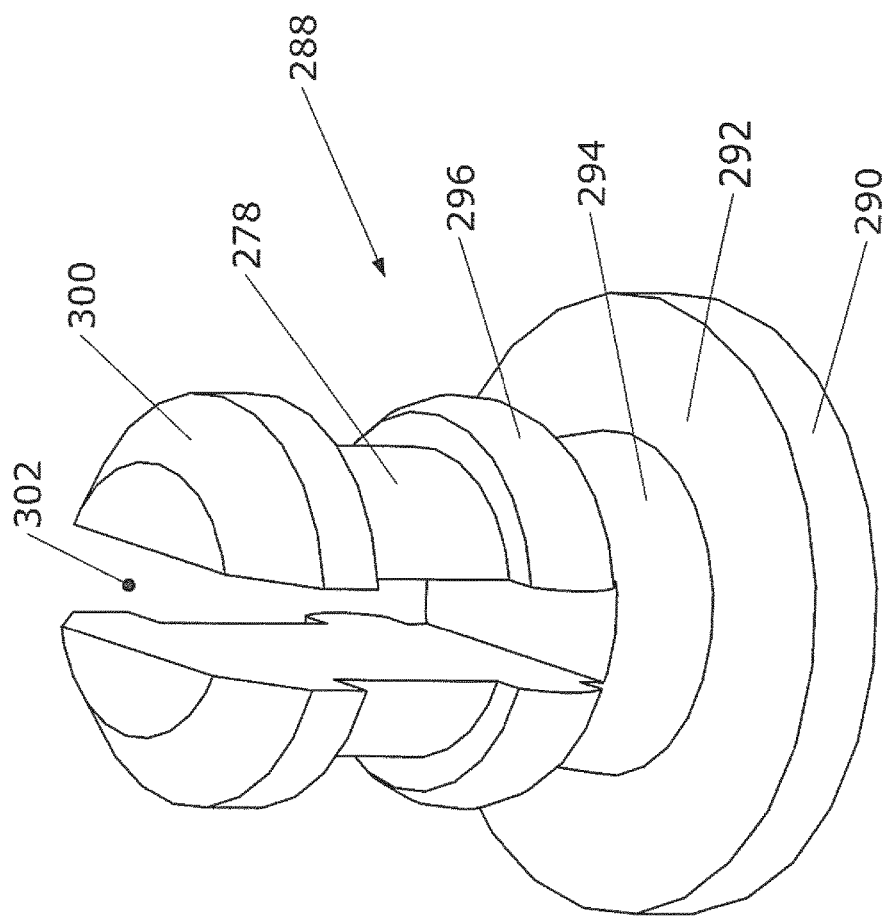
FIG. 33 is a perspective view, showing a sealing plug made according to the present, invention.

FIGS. 33-36 depict an embodiment including a valve placed in the overflow. The valve selectively opens and closes the overflow. FIG. 33 shows the body of the valve plug 288. Plug 288 is shown in an inverted state (inverted with respect to the orientation in which it is customarily used). Sealing plate 290 includes sealing surface 292. A complex protrusion extends from sealing surface 292. The protrusion contains several significant features. In sequence, these are: tapered plug 294, rib 236, cylinder 298, and retaining expansion 300. Transverse slot 302 extends laterally through at least the rib, the cylinder, and the retaining expansion. However, in the embodiment illustrated, the transverse slot does not extend all the way through the tapered plug.

Figure 34:
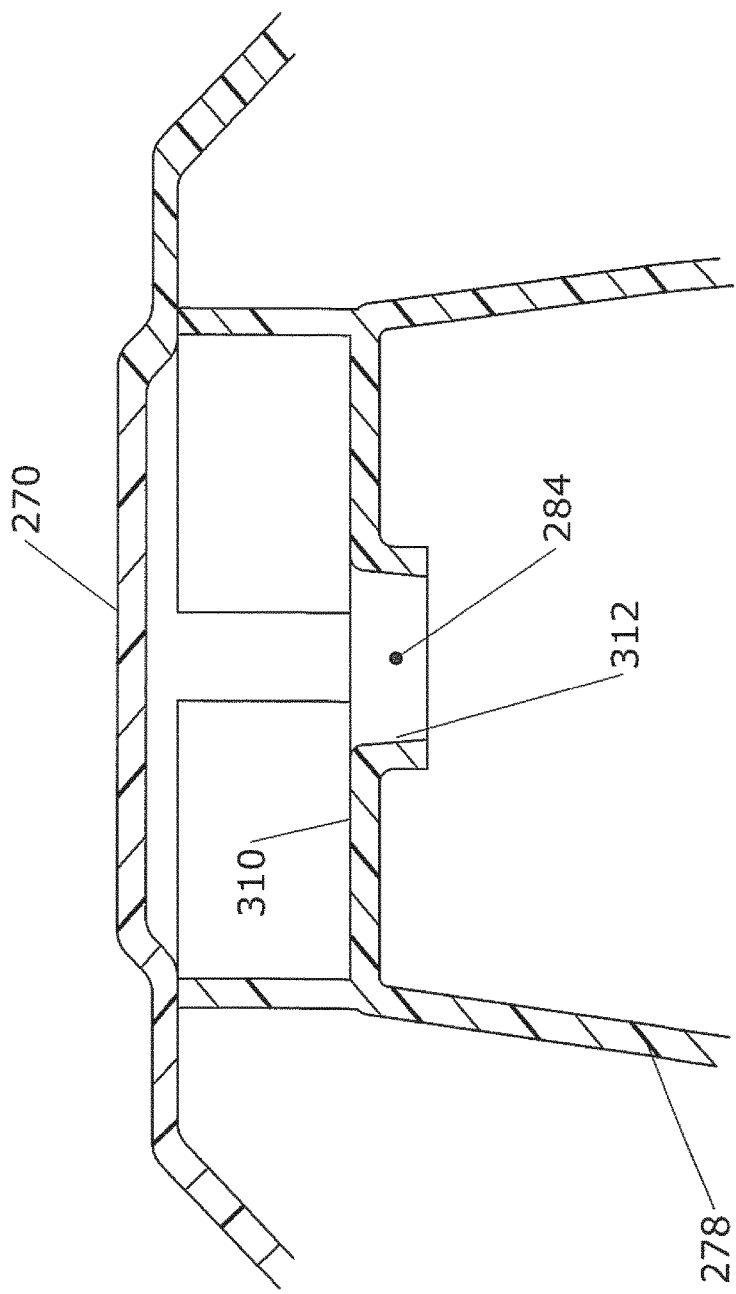
FIG. 34 is a sectional detail view, showing the area of the overflow in the container.

FIG. 34 shows the container geometry designed to receive plug 288 (and thereby create a functioning valve) in more detail. Horizontal surface 310 lies across the top of central tower 278. Overflow 284 is preferably surrounded by tapered side wall 312. The angle of tapered side wall 312 preferably matches the angle of tapered plug 294 shown in FIG. 33.

Figure 35:
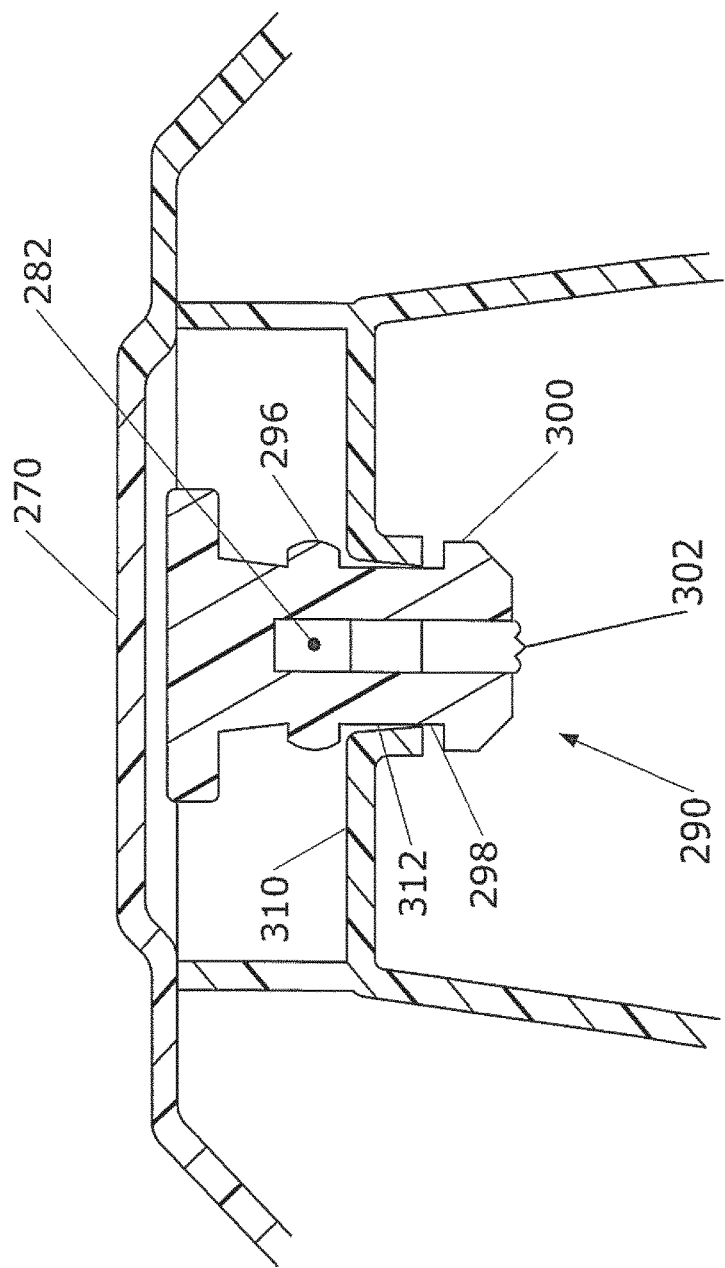
FIG. 35 is a sectional detail view, showing the area of the overflow with a sealing plug in the "open" position.

FIG. 35 is a sectional elevation view showing sealing plug 283 in position within overflow 284. The plug may be switched between an "open" position in which water can flow through overflow 284 and a "closed" position in which flow is prevented. FIG. 35 shows the "open" position.

Rib 296 lies above horizontal surface 310, and the interference between the two tends to prevent the sealing plug moving further downward. Cylinder 298 forms a sliding fit with tapered side wall 312.

Retaining expansion 300 lies below the lowest extent of tapered side wall 312. The retaining expansion tends to prevent the sealing plug being pulled upward and completely out of overflow 284, since it will have to be compressed to pass through the overflow.

In the open position as shown in FIG. 35, the presence of transverse slot 302 allows water to pass through sealing plug 238 (and therefore through overflow 284). Water passing into the container will flow into the volume inside support ring 280. It will then flow beyond the support ring through gap 282. In the view of FIG. 35, transverse slot 302 and gap 282 are aligned, but the flow will still occur even if gap 282 and transverse slot 302 are not aligned.

Transverse slot 302 allows water to flow into or out of the volume contained within support ring 280. The water will "find its way" through a gap or gaps provided in the support ring and into the interior of the container.

In order to seal overflow 284, the user pushes down on the sealing plug to transition it to the "closed" position. The plant pot may be removed to provide easy access to the sealing plug. The user then presses down on sealing plate 290. The downward, pressure forces rib 296 through and past tapered side wall 312.

Figure 36:
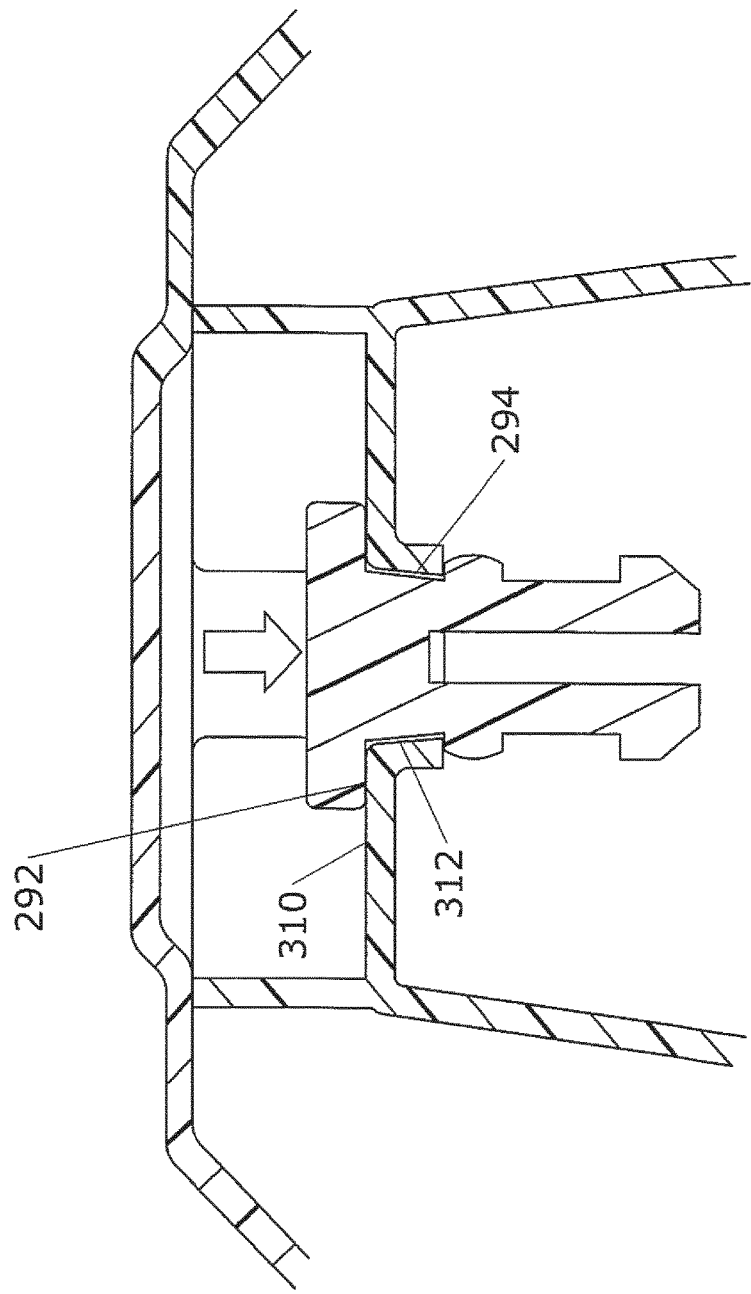
FIG. 36 is a sectional detail view, showing the area of the overflow with a sealing plug in the "closed" position.

The result is shown in FIG. 36. Once the rib descends past the tapered side wall, tapered plug 294 comes to rest against the tapered side wall. This interaction, acts like a stopper in a drain. Further, sealing surface 232 presses down against horizontal surface 310 producing another seal. The reader will note that transverse slot 302 in the sealing plug no longer provides a passage for water. Its uppermost extreme does not extend beyond tapered side wall 312. Further downward motion of the plug is prevented by sealing surface 292 coming to rest on horizontal surface 310. However the user may return the plug to the "open" position by bending upward a portion of the perimeter of sealing plate 290 and pulling the plug upward. The plug will then snap back into the position shown in FIG. 35.

However, absent a force prying the plug upward, it is retained in the position shown in FIG. 36 by rib 296 lying below the lower extent of tapered side wall 312.

The sealing plug is preferably made of a flexible material such as silicone rubber. Such a material provides a suitable frictional engagement while also providing a water tight seal. The presence of transverse slot 302 also permits an appropriate amount of deflection in order for the plug to pop into the two stable positions shown in FIGS. 35 and 36.

The use of flexible material—in combination with the geometry of the plug—means that the plug may be installed and removed without the use of any tools. The plug is installed initially by pressing it into place. It is switched between the open and closed positions by pushing it down or pulling it up. The inclusion of retaining expansion 300 means that the plug is not likely to become separated from the container.

The ability to selectively open and close she plug provides an advantage during shipping and any subsequent sales display. The plug will customarily be pressed closed during shipping. However, once the assembly of the plant pot and container arrives at a point of sale, it may be desirable to open the plug again in order to take advantage of available irrigation systems.

FIGS. 22 and 23 show exemplary display systems that also provide irrigation. The plant pot/container assembly of FIG. 32 may be placed in a support such as shown in FIG. 23. The sealing plug is pulled upward to the "open" position before the assembly is placed in the support.

Water will then be added up to and beyond, overflow level 286 so that water flows into the container through overflow 284.

When the plant is sold, the sealing plug may be pressed back to the "closed" position. The buyer then waters the assembly normally by pouring water into the open top of the plant pot (the assembly being shown in FIG. 32). Water will flow down through the holes 268 and accumulate as water supply 65. The wicks will then carry the water—at a suitable rate—back up into soil 2. The assembly may also be used in a system that does not include wicks, such as by extending the defined overflow level to a point above the bottom of the plant pot.

Many other alternative configurations may also turn out to be fruitful or effective, which should all be considered within the realm of possibilities, that would immediately spring to mind to the skilled person, after having been confronted, with the foregoing description and accompanying drawings.

Many other additional and alternative embodiments would also practically force themselves upon the skilled person, where the alternative or additional embodiments are all within the scope of protection of the present invention according to the wording or spirit of the accompanying claims, and are in this sense to be considered embodiments of the present invention.

The invention claimed is:

1. A plant pot assembly, comprising:
   (a) a container, having a container bottom and an overflow;
   (b) a plant pot nested in said container, said plant pot having a plant pot bottom and at least one side wall extending from said plant pot bottom up to a top rim, said plant pot bottom and said at least one side wall defining an interior of said plant pot;
   (c) at least one hole in said plant pot located in or proximate to said plant pot bottom;
   (d) a substrate filling said interior of said plant pot up to a top level in said plant pot;
   (e) at least one wick extending from below said plant pot bottom, through said hole, and into said interior of said plant pot;
   (f) said at least one wick having a first end and a second end;
   (g) said at least one wick being doubled back on itself in said plant pot to define a first leg, a second leg, and a loop between said first and second legs;
   (h) said loop lying above said top level of said substrate;
   (i) said first end and said second end of said wick lying outside said plant pot but inside said container;
   (j) an anchor attached to said loop, said anchor being separate from said plant pot, said anchor rest on top of said substrate and engage said substrate, said anchor forming stretching element extending along an interior surface of said loop, said anchor exerts a spreading force to stretch open said loop in order to prevent said loop sinking below said top level of said substrate;
   (k) said container having the overflow lying below said plant pot bottom; and
   (l) said first end and said second end of said wick extending below said overflow.

2. The plant pot assembly as recited in claim 1, wherein said anchor comprises a label that carries readable information.

3. The plant pot assembly as recited in claim 2, further comprising a water supply below said plant pot, with said wick extending into said water supply.

4. The plant pot assembly as recited in claim 1, wherein said wick is made of a fibrous material selected from the group consisting of cotton, woven cotton rope, wool, acrylic string, hemp rope, synthetic shoe laces, chamois (100% rayon), braided polypropylene rope, and nylon rope.

5. The plant pot assembly as recited in claim 1, wherein said wick is made of a fibrous material selected from the group consisting of cotton, woven cotton rope, wool, acrylic string, hemp rope, synthetic shoe laces, chamois (100% rayon), braided polypropylene rope, and nylon rope.

6. The plant pot assembly as recited in claim 1, further comprising a water supply below said plant pot, with said wick extending into said water supply.

7. A plant pot assembly, comprising:
   (a) a container, having a container bottom and an overflow;
   (b) a plant pot nested in said container, said plant pot including,
      (i) a plant pot bottom,
      (ii) a side wall connected to said plant pot bottom and extending upward therefrom to a top rim,
      (iii) said plant pot bottom and said side wall enclosing an interior of said plant pot;
   (c) at least one hole passing into said interior of said plant pot, said hole being located proximate said plant not bottom;
   (d) a substrate filling said interior of said plant pot up to a top level in said plant pot;
   (e) at least one wick extending from below said plant pot, through said hole, and into said interior of said plant pot;
   (f) said at least one wick having a first end and a second end, and being doubled back on itself to define a first leg, a second leg, and a loop between said first and second legs;
   (g) said first and second ends of said wick lying outside said plant pot;
   (h) said loop of said wick lying above said top level of said substrate;
   (i) an anchor attached to said loop, with said anchor being separate from said plant pot, said anchor forming stretching element extending along an interior surface of said loop, said anchor exerts a spreading force to stretch open said loop, thereby causing said loop to engage said substrate and prevent said loop sinking into said substrate;

(j) said container having the overflow lying below said plant not bottom; and (k) said first end and said second end of said wick extending below said overflow.

8. The plant pot assembly as recited, in claim 7, wherein said anchor comprises a label that carries readable information.

9. The plant pot assembly as recited in claim 7, wherein said, wick is made of a fibrous material selected from the group consisting of cotton, woven cotton rope, wool, acrylic string, hemp rope, synthetic shoe laces, chamois (100% rayon), braided polypropylene rope, and nylon rope.

10. The plant pot assembly as recited in claim 7, further comprising a water supply below said plant pot, with said wick extending into said water supply.

\* \* \* \* \*